United States Patent
Kawasumi et al.

[11] Patent Number: 5,978,065
[45] Date of Patent: Nov. 2, 1999

[54] LIQUID CRYSTAL DEVICE AND MANUFACTURING METHOD AND APPARATUS THEREFOR

[75] Inventors: Koichi Kawasumi; Takeshi Yamasaki; Eriko Matsui, all of Kanagawa; Akio Yasuda, Tokyo; Yuji Shiina, Kanagawa; Tadashi Kiyomiya, Saitama; Yoshihiro Yamaguchi, Tokyo, all of Japan

[73] Assignee: Sony Corporation, Tokyo, Japan

[21] Appl. No.: 08/965,967

[22] Filed: Nov. 7, 1997

[30] Foreign Application Priority Data

Nov. 8, 1996 [JP] Japan ................................ P08-312803

[51] Int. Cl.⁶ ............................ G02F 1/13; G02F 1/1341; G02F 1/1339

[52] U.S. Cl. ........................... 349/188; 349/189; 349/190

[58] Field of Search ..................................... 349/189, 190, 349/188; 396/586; 156/295; 264/46.3

[56] References Cited

U.S. PATENT DOCUMENTS

| | | | |
|---|---|---|---|
| 4,820,025 | 4/1989 | Nakanowatari | 350/334 |
| 5,332,521 | 7/1994 | Yuasa et al. | 359/76 |
| 5,361,152 | 11/1994 | Harada et al. | 359/80 |
| 5,838,409 | 11/1998 | Tomono et al. | 349/122 |

Primary Examiner—William L. Sikes
Assistant Examiner—Joanne Kim
Attorney, Agent, or Firm—Hill & Simpson

[57] ABSTRACT

A liquid crystal is dropped on one end portion of a bottom substrate that is coated with a sealing material in an outer peripheral portion. After a top substrate is laid on the bottom substrate, the liquid crystal is expanded from the one end portion of the bottom substrate toward the other end portion. If necessary, an air ejecting opening is formed in the sealing material at a position located in the other end portion of the bottom substrate. The surfaces of the top and bottom substrates may be formed with grooves for accommodating an excessive part of the liquid crystal at positions inside the sealing member. As a result, no air bubbles remain in the liquid crystal even if the charging of the liquid crystal is performed at the atmospheric pressure.

24 Claims, 12 Drawing Sheets

LIQUID CRYSTAL DEVICE AND MANUFACTURING METHOD AND APPARATUS THEREFOR

BACKGROUND OF THE INVENTION

The present invention relates to liquid crystal devices such as a liquid crystal panel and a manufacturing method and apparatus therefor.

Among conventional manufacturing methods of liquid crystal devices such as a liquid crystal panel, the injection method is well known. In the injection methods, an empty panel is formed by bonding and fixing to each other, with a sealing material, peripheral portions of a pair of substrates that are opposed to each other with a predetermined gap of 1–10 µm. Then, after the empty panel is accommodated in a vacuum apparatus, the inside of the panel is rendered in a vacuum state and an injection opening that is formed in advance in the sealing material portion is immersed in a liquid crystal. Thereafter, by slowly returning the pressure of the inside of the vacuum apparatus to the atmospheric pressure, the liquid crystal is injected into the panel by utilizing the panel inside/outside pressure difference and the capillary action. However, the injection method has a problem that it takes long time to inject a liquid crystal which has a relatively high viscosity. In particular, the injection time increases with the size of a liquid crystal device. There are additional problems that a preprocessing time is needed to render the inside of the vacuum apparatus in a vacuum state, and that an expensive vacuum apparatus is needed. That is, the conventional injection method has the problems of a long manufacturing time and a high cost.

In view of the above, a new method called a dropping method or a coating method has been proposed as disclosed in Japanese Unexamined Patent Publication Nos. Sho. 60-75817, Sho. 60-230636, Hei. 1-303414, Hei. 3-25416, and Hei. 4-218027. In this method, first, a sealing material is applied to one of a pair of substrates to as to surround a display area. After a liquid crystal is dropped on or applied to the display area, the other substrate is pressure-bonded to the one substrate in a vacuum apparatus so that they are rendered parallel with each other and the sealing material is then cured. This method can greatly shorten the time required for the liquid crystal injection. However, because the substrates need to be laid one on another in a vacuum, this method still has the problems that a preprocessing time is needed to render the inside of the vacuum apparatus in a vacuum state and that an expensive vacuum apparatus is needed. That is, this method also has the problems of a long manufacturing time and a high cost.

Japanese Unexamined Patent Publication Nos. Hei. 2-84616, Hei. 2-123324, and Hei. 6-208097 disclose another method in which in the above dropping or coating method the substrates are laid one on another in the air. Because no vacuum apparatus is needed, this method can reduce the manufacturing time and the cost from the case of the dropping method or coating method using a vacuum apparatus. However, in this method, because the substrates are laid one on another in the air, air bubbles may remain in the liquid crystal in the display area during the substrates combining operation, to become display defects. This causes a problem of a reduction in yield.

To solve the problem of residual air bubbles, various methods have been proposed. For example, Japanese Unexamined Patent Publication No. Hei. 3-89315 discloses a method in which a liquid crystal is applied in a predetermined pattern, i.e., in thin lines, and substrates are laid one on another slowly or intermittently. Japanese Unexamined Patent Publication No. Hei. 4-179919 discloses a method in which a pair of substrates are opposed to each other to form a wedge shape or so that one of the substrates is warped to assume a convex shape, and the substrates are pressure-bonded to each other in such a manner that they gradually approach each other and are finally rendered parallel with each other. However, in these methods, the substrates combining operation takes long time and a special device is needed to laying the substrates one on another accurately. Thus, these methods still have the problems of a long manufacturing time and a high cost.

SUMMARY OF THE INVENTION

An object of the invention is therefore to provide a liquid crystal device and a manufacturing method and apparatus therefor which enables a liquid crystal to be sealed in the air simply in a short time without causing residual air bubbles in the liquid crystal.

To attain the above object, the invention provides a manufacturing method of a liquid crystal device in which a pair of substrates that are opposed to each other with a predetermined gap are fixed to each other at a bonding region that is provided along an outer periphery of the substrates and a liquid crystal is sealed between the substrates in a liquid crystal area that is inside the bonding region, comprising the steps of applying a curable adhesive to at least one of the substrates in the bonding region; supplying a liquid crystal to one end portion, in the liquid crystal area, of at least one of the substrate by a predetermined amount; opposing the substrates to each other with the curable adhesive and the liquid crystal interposed in between; expanding the liquid crystal from the one end portion to cover the entire liquid crystal area by exerting pressure on at least one of the opposed substrates from the one end portion to the other end portion in the liquid crystal area by a pressing means while moving the pressing means relative to the substrates; and curing the curable adhesive.

According to one embodiment of the invention, the liquid crystal area is a display area, and in the expanding step a pressure roller is rotated and moved on the at least one of substrate from the one end portion to the other end portion, whereby the liquid crystal is expanded from the one end portion to occupy the entire liquid crystal area.

According to one embodiment of the invention, in the expanding step the pressing means is moved from a position that is outside the one end portion and close to an edge of the at least one substrate.

According to one embodiment of the invention, in the expanding step the pressure roller exerts pressure on the at least one substrate as the substrates are relatively moved, and a resulting pressurized state of the substrates is maintained by an auxiliary roller.

According to one embodiment of the invention, the auxiliary roller has a smaller diameter than the pressure roller.

According to one embodiment of the invention, in the applying step at least one air ejecting portion where the curable adhesive is not applied is formed in the vicinity of the other end portion.

According to one embodiment of the invention, an opposed surface of at least one of the substrates is formed with at least one groove between the liquid crystal area and the bonding region, and in the expanding step at least an excessive part of the liquid crystal is accommodated in the groove.

According to one embodiment of the invention, in the opposing step the grooves are connected to each other so as to surround the liquid crystal area in loop form when the grooves are projected onto a plane parallel with the opposed substrates.

According to one embodiment of the invention, the opposed surface of the at least one substrate is formed with an air ejecting groove that communicates with the at least one groove and extends to an edge of the at least one substrate, and in the expanding step air that is forced to escape from the liquid crystal is ejected through the air ejecting groove.

According to one embodiment of the invention, the at least one groove has a width of 200 μm or more and a depth of 20 μm or more.

According to one embodiment of the invention, the liquid crystal is a ferroelectric liquid crystal.

According to one embodiment of the invention, the liquid crystal is mixed with fine particles having an average primary particle diameter of 1 μm or less.

According to one embodiment of the invention, in the expanding step the substrates are heated to a temperature that is between a transition temperature between a smectic A phase and a cholesteric phase of the liquid crystal and a temperature 4° C. higher than the transition temperature and that is not higher than a transition temperature between the cholesteric phase and an isotropic phase of the liquid crystal.

According to one embodiment of the invention, after the expanding step the curable adhesive is cured while or after pressure is exerted uniformly on both outer surfaces of the opposed substrates.

The invention provides a liquid crystal device comprising a pair of substrates that are opposed to each other with a predetermined gap and fixed to each other at a bonding region that is provided along an outer periphery of the substrates; a liquid crystal sealed between the substrates in a liquid crystal area that is inside the bonding region; and at least one groove formed on an opposed surface of at least one of the substrates between the liquid crystal area and the bonding region.

According to one embodiment of the invention, the liquid crystal area is a display area.

According to one embodiment of the invention, the grooves are connected to each other so as to surround the liquid crystal area in loop form when the grooves are projected onto a plane parallel with the opposed substrates.

According to one embodiment of the invention, the opposed surface of the at least one substrate is formed with an air ejecting groove that communicates with the at least one groove and extends to an edge of the at least one substrate.

According to one embodiment of the invention, the at least one groove has a width of 200 μm or more and a depth of 20 μm or more.

According to one embodiment of the invention, the liquid crystal is a ferroelectric liquid crystal.

According to one embodiment of the invention, the liquid crystal is mixed with fine particles having an average primary particle diameter of 1 μm or less.

The invention provides a manufacturing apparatus of a liquid crystal device in which a pair of substrates that are opposed to each other with a predetermined gap are fixed to each other at a bonding region that is provided along an outer periphery of the substrates and a liquid crystal is sealed between the substrates in a liquid crystal area that is inside the bonding region, comprising the steps of means for applying a curable adhesive to at least one of the substrates in the bonding region; means for supplying a liquid crystal to one end portion, in the liquid crystal area, of at least one of the substrate by a predetermined amount; means for opposing the substrates to each other with the curable adhesive and the liquid crystal interposed in between; pressing means for expanding the liquid crystal from the one end portion to cover the entire liquid crystal area by exerting pressure on at least one of the opposed substrates from the one end portion to the other end portion in the liquid crystal area; and means for curing the curable adhesive.

According to one embodiment of the invention, the liquid crystal area is a display area, and the pressing means comprises a pressure roller that is rotated and moved on the at least one of substrate from the one end portion to the other end portion, whereby the liquid crystal is expanded from the one end portion to occupy the entire liquid crystal area.

According to one embodiment of the invention, the pressing means exerts the pressure from a position that is outside the one end portion and close to an edge of the at least one substrate.

DETAILED DESCRIPTION OF THE PREFERRED EMBODIMENTS

Preferred embodiments of the present invention will be hereinafter described with reference to the accompanying drawings.

Embodiment 1

A first embodiment in which the invention is applied to a manufacturing method of an active matrix liquid crystal display device such as a liquid crystal panel will be described below with reference to FIGS. 1A–1C to FIGS. 3A–3B.

Figure 1A:
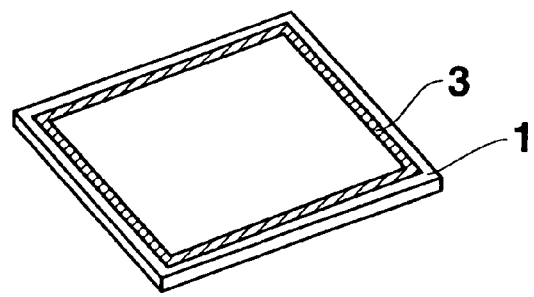
FIGS. 1A–1C are general perspective views showing, in order, steps of a manufacturing method of an active matrix liquid crystal display device according to a first embodiment of the present invention.
Figure 1B:
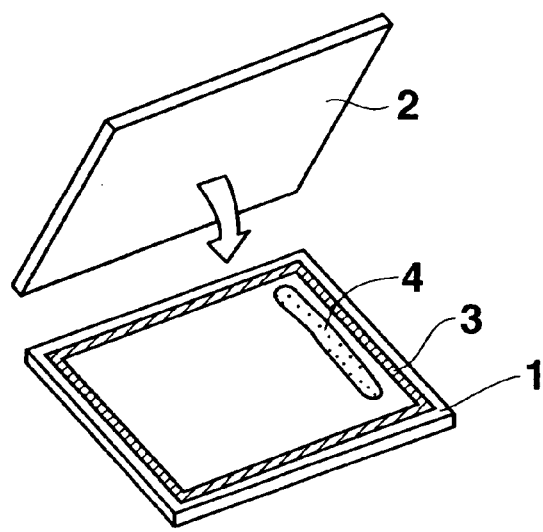

First, as shown in FIGS. 1A and 1B, a pair of, i.e., top and bottom, substrates 2 and 1 are prepared that will constitute an active matrix liquid crystal device. For example, the substrate 1 has, on a glass substrate, matrix-like pixel electrodes (see FIG. 5A) and thin-film transistors (not shown) connected thereto, as well as an alignment film (not shown) formed thereon. On the other hand, the substrate 2 has color filters (not shown), a transparent common electrode (see FIG. 5A), and an alignment film (not shown) on a glass substrate.

As shown in FIG. 1A, a sealing material 3 of an ultraviolet curable adhesive, for instance, is applied with a dispenser to a bonding region (that is along the periphery) of the opposed surface of the substrate 1 on which the alignment film is formed so as to surround a display area in closed loop form. Alternatively, the sealing material 3 may be applied to the opposed surface of the substrate 2 on which the alignment film is formed, or the opposed surfaces of both substrates 1 and 2.

Then, as shown in FIG. 1B, a liquid crystal 4 whose amount is measured accurately with a dispenser, for instance, is dropped on the opposed surface of the substrate 1 straightly along one sideline thereof at one end portion of the display area. Alternatively, the liquid crystal 4 may be applied to the opposed surface of the substrate 2, or the opposed surfaces of both substrates 1 and 2. Further, the application pattern of the liquid crystal 4 is not limited to the straight shape, and it may be a curved line shape or a dotted line shape. Further, the liquid crystal 4 may additionally be dropped at other positions in the display area to improve the uniformity of its spread.

The liquid crystal 4 used in this embodiment is of a type that is operational by itself and is, for instance, of a nematic type being flowable at the normal temperature. It is preferable that the liquid crystal 4 be mixed with spacer particles for controlling the gap between the substrates 1 and 2. The spacer particles may be dispersed in advance on the opposed surface of one or both substrates 1 and 2. In such a case, spacers coated with thermoplastic resin may be fixed to the substrates 1 and 2 that are heated.

Figure 1C:
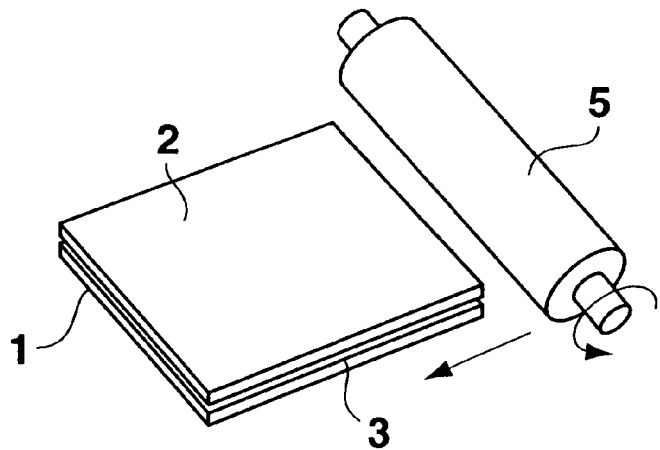
Figure 3A:
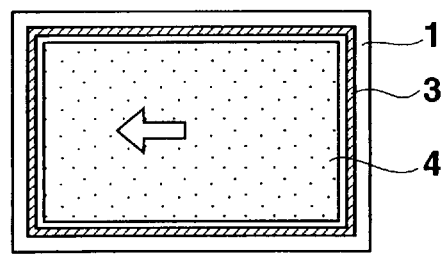
FIGS. 3A and 3B are a general plan view and sectional view showing the manufacturing method of an active matrix liquid crystal display device according to the first embodiment of the invention.

Then, as shown in FIG. 1C, the substrate 2 is laid on the substrate 1 so that the opposed surfaces face each other. For example, this state is maintained until the liquid crystal 4 expands due to the weight of the top substrate 2 to completely occupy the portion of the display area close to the portion of the bonding region adjacent to the liquid crystal 4. Thereafter, as shown in FIG. 3A, the liquid crystal 4 is expanded to occupy the entire display area by, for instance, moving and rotating a pressure roller 5 on the substrate 2. At this time, the spacer particles that are mixed in the liquid crystal 4 are also distributed over the entire display area together with the liquid crystal 4, so that a desired gap is formed between the substrates 1 and 2. By expanding the liquid crystal 4 in one direction with the pressure roller 5 in the above manner, air bubbles that are once involved in the liquid crystal 4 are forced to escape from the liquid crystal 4 as the liquid crystal 4 expands. Further, the liquid crystal 4 does not go into the sealing portion of the sealing material 3 due to its lateral expansion.

It is preferable that the pressure of the pressure roller 5 be within a range of 2–15 $kg/cm^2$. If the pressure is lower then this range, the liquid crystal 4 is not expanded sufficiently and the desired gap between the substrates 1 and 2 may not be obtained. Conversely, if the pressure is higher than the this range, the alignment films formed on the opposed surfaces of the substrates 1 and 2 may be damaged or the spacer particles for maintaining the substrate gap may be broken, in which case the desired substrate gap cannot be obtained either.

Figure 3B:
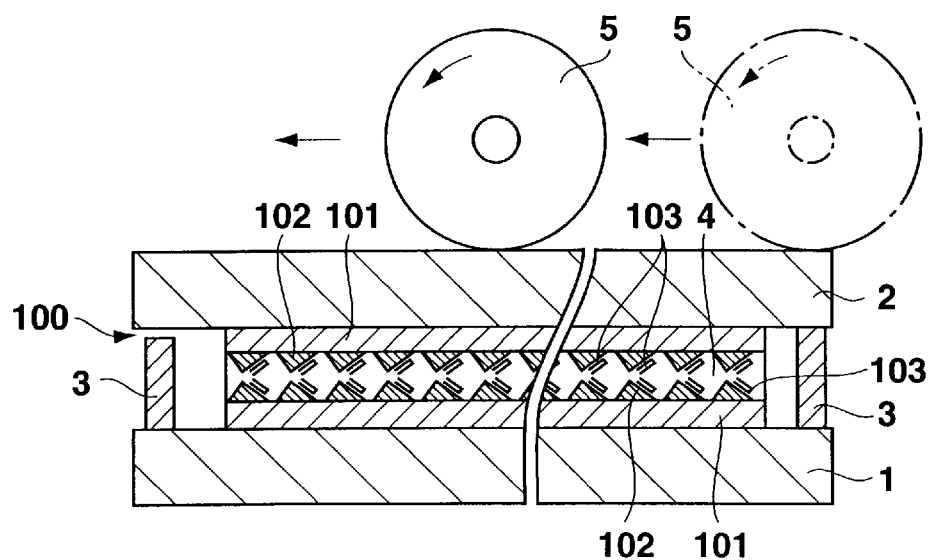

As shown by chain lines in a schematic sectional view of FIG. 3B, it is preferable that the movement of the pressure roller 5 be started from a position that is outside the position where the liquid crystal 4 was applied first and close to the edge of the substrate 2. By virtue of this measure, the liquid crystal 4 is reliably pushed and expanded from the one end portion of the display area where the liquid crystal 4 was applied first. At this time, the sealing material 3 is not yet in sufficiently close contact with the substrate 2, and hence spaces 100 are formed in places. Since air properly escapes through the spaces 100, air bubbles are prevented from remaining in the liquid crystal 4 and the sealing pattern of the sealing material 3 is prevented from being disordered or broken. Further, if the pressure roller 5 is moved in the rubbing direction (see FIG. 3B) of alignment films 102 (for instance, polyimide rubbing films) that are formed on transparent electrodes 101 of the substrates 1 and 2, for instance, molecules 103 of the liquid crystal 4 are oriented more easily.

The pressing means is not limited to a roller such as the pressure roller 5, and a roll and other pressing means can be used. Further, rather than the pressing means, the substrates 1 and 2 may be moved.

Figure 2:
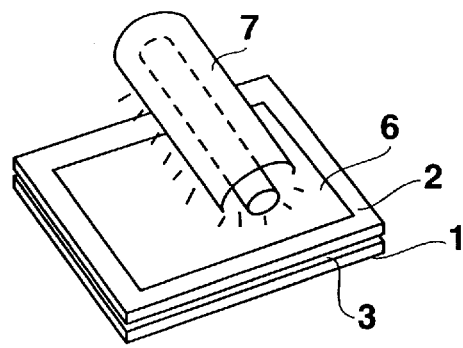
FIG. 2 is a general perspective view showing the manufacturing method of an active matrix liquid crystal display device according to the first embodiment of the invention.

Then, as shown in FIG. 2, with the display region (which is supplied with the liquid crystal 4) shielded by a stainless steel plate 6 or the like, the sealing material 3 is cured by illuminating it with ultraviolet light emanating from an ultraviolet lamp 7. It is preferable that before or during the curing of the sealing material 3, the substrates 1 and 2 be uniformly pressed from above and below by hot press or the like. By virtue of this measure, the substrate gap can be made uniform, which enables manufacture of a high-quality liquid crystal display device that is free of display unevenness.

In the first embodiment, the liquid crystal 4 is supplied to one end portion of the display area inside the bonding region that is coated with the sealing material 3 and on at least one of the substrates 1 and 2. After the substrate 2 is opposed to and laid on the substrate 1, the pressure roller 5 is rotated and moved from the one end portion of the display region where the liquid crystal is supplied to the other end portion, whereby the liquid crystal 4 is pushed and expanded from the one end portion to the other end portion to occupy the entire display area. Therefore, the charging of the liquid crystal 4 can be performed in a short time. Further, even if the liquid crystal 4 is expanded at the atmospheric pressure, no air bubbles remain in the liquid crystal 4 because air bubbles once introduced in the liquid crystal 4 are forced to escape from the liquid crystal 4 as it expands. Therefore, it is not necessary to use an expensive vacuum apparatus unlike the cases of the conventional methods, and hence the manufacturing cost can be kept low. Further, since the substrate 2 can be laid on the substrate 1 without the need for holding the substrate 1 or 2 in a forced posture, the accurate operation of combining the substrates 1 and 2 can be performed simply in a short time. Further, there is an additional advantage that a desired substrate gap can be obtained by properly adjusting the pressure of the pressure roller 5.

Embodiment 2

A second embodiment of the invention will be described below with reference to FIGS. 4A–4C. The parts in the second embodiment that have corresponding parts in the first embodiment are given the same reference numerals as the latter.

Figure 4A:
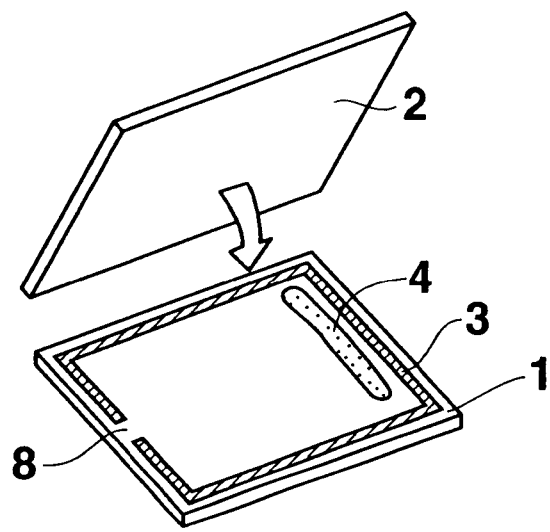
FIGS. 4A–4C are general perspective views showing, in order, steps of a manufacturing method of an active matrix liquid crystal display device according to a second embodiment of the invention.

As shown in FIG. 4A, in the second embodiment, when the sealing material 3 is applied to the bonding region of the substrate 1, an air ejecting portion 8 where the sealing material 3 is not applied is formed adjacent to the sideline that is opposite the sideline along which the liquid crystal 4 is to be dropped. By virtue of this measure, as shown in FIG. 4B, when the pressure roller 5 is rotated and moved, air that is forced to escape from the expanding liquid crystal 4 is smoothly ejected through the air ejecting portion 8. The air ejecting potion 8 may be formed at a plurality of locations rather than at only one location. In such a case, the air ejecting portions 8 may be formed adjacent to the sidelines other than the sideline that is opposite the sideline along which the liquid crystal 4 is to be dropped.

Figure 4B:
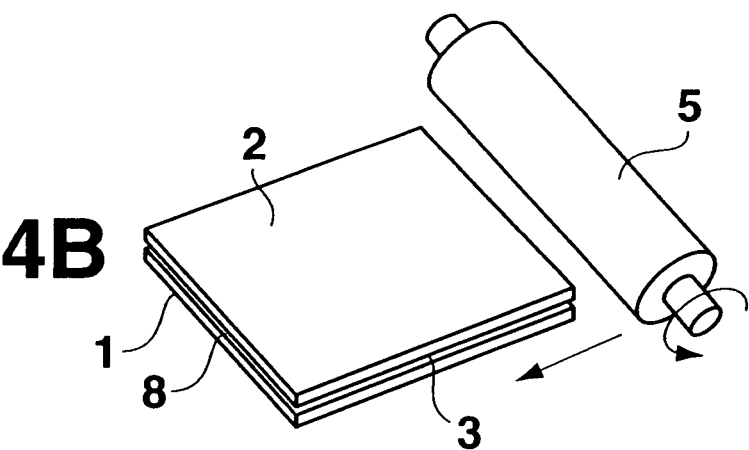
Figure 4C:
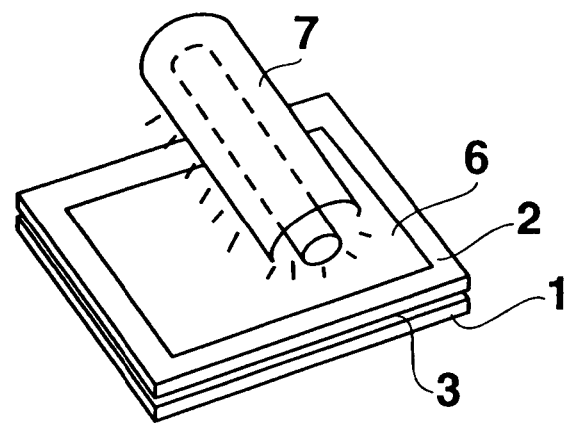

After the sealing material 3 is cured as shown in FIG. 4C, the air ejecting portion 8 is sealed by applying a sealing material there.

The other part of the second embodiment is the same as the corresponding part of the first embodiment.

In addition to the advantages of the first embodiment, the second embodiment provides advantages that air bubbles can be prevented more effectively from remaining in the liquid crystal 4 and that a liquid crystal display device can be obtained which is free of disorder of the sealing pattern of the sealing material 3 and any residual air in inside end portions of the bonding region.

Embodiment 3

FIGS. 5A–5B and 6A–6C show a third embodiment of the invention. The parts in the third embodiment that have corresponding parts in the first and second embodiments are given the same reference numerals as the latter.

Figure 5A:
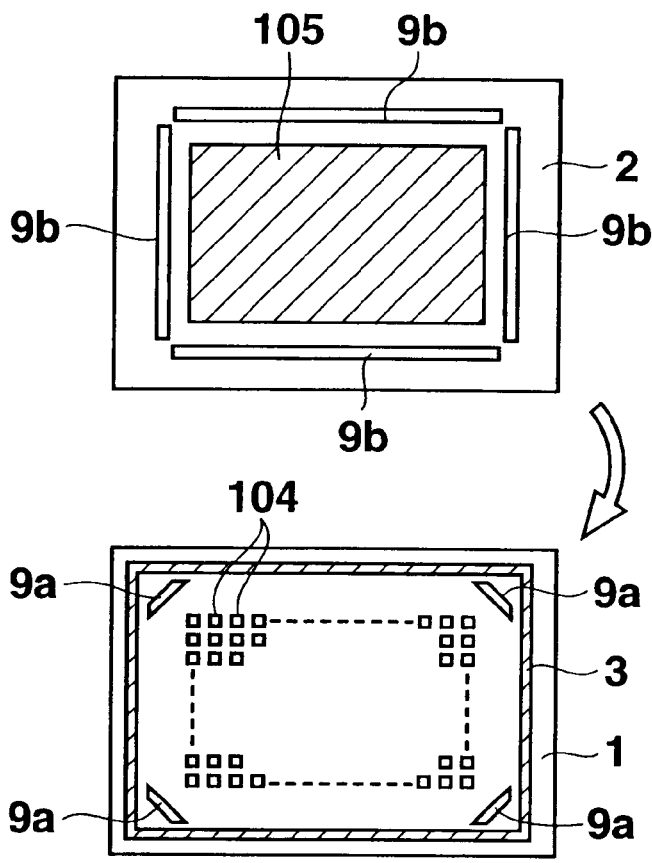
FIGS. 5A and 5B are a general plan view and perspective view showing, in order, steps of a manufacturing method of an active matrix liquid crystal display device according to a third embodiment of the invention.
Figure 5B:
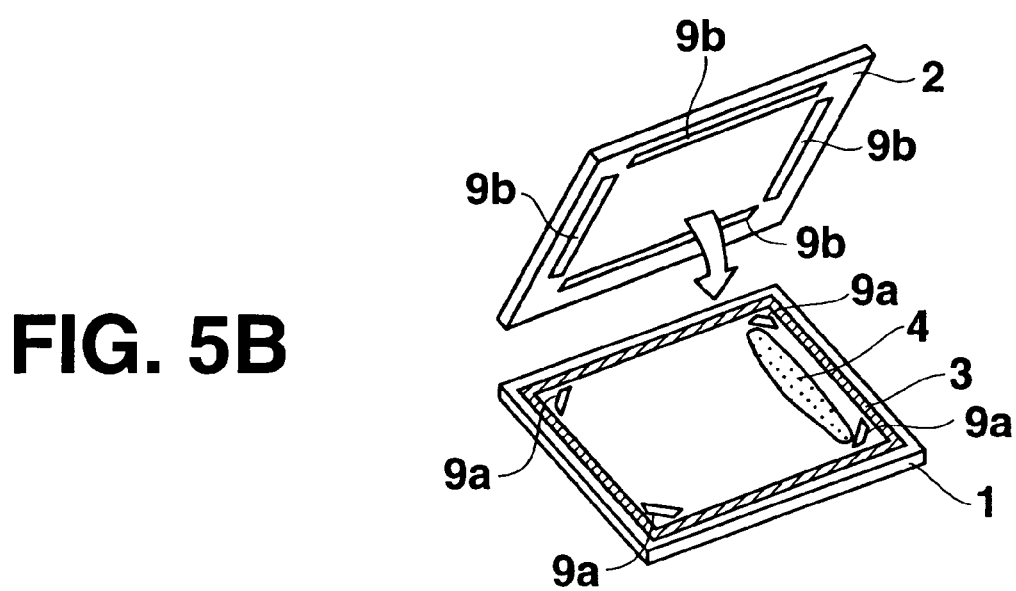
Figure 6A:
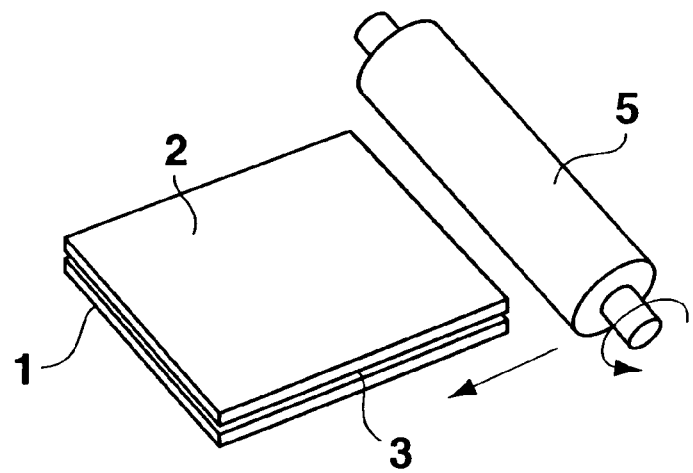
FIGS. 6A–6C are a general perspective view, plan view, and perspective view showing, in order, steps of the manufacturing method of an active matrix liquid crystal display device according to the third embodiment of the invention.
Figure 6B:
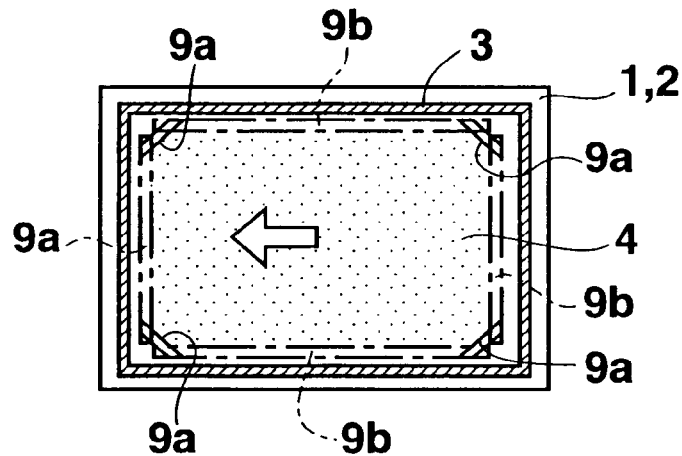

As shown in FIGS. 5A and 5B, in the third embodiment, prior to the formation of the alignment films, the opposed surfaces of the substrates 1 and 2 are formed with grooves 9a and 9b, respectively, at positions inside the bonding region. The grooves 9a and 9b are formed in such patterns as not to interfere with lead-out portions of electrodes that are formed on the substrates 1 and 2. For example, in the case of FIGS. 5A and 5B, the grooves 9a are formed in the four corners of the display area so as to avoid lead-out portions of pixel electrodes 104 that are formed on the substrate 1. On the other hand, since a transparent common electrode 105 is formed on the substrate 2, the relatively long grooves 9b can be formed at the four sides of the display area. As shown in FIG. 6B, when the substrates 1 and 2 are opposed to each other, the grooves 9a and 9b overlap and connect with each other so as to surround the display area in closed loop form.

The grooves 9a and 9b provide the following advantages. In a case where an excessive part of the liquid crystal 4 comes out of the intended display area as shown in FIG. 6B when the liquid crystal 4 is expanded by the pressure roller 5 as shown in FIG. 6A, the excessive part goes into the grooves 9a and 9b. Therefore, the excessive part of the liquid crystal 4 does not enter the sealing portion of the sealing material 3, and hence there does not occur deterioration in display quality or a panel bonding failure each of which would otherwise be caused by contact between the liquid crystal 4 and the sealing material 3. Further, since it is not necessary to accurately control the dropping amount of the liquid crystal 4, the process is simplified. In addition, the grooves 9a and 9b also serve to accommodate part of the sealing material 3 coming out of the bonding region.

Although the effect of accommodating part of the liquid crystal 4 or the sealing material 3 is particularly remarkable in the case where the grooves 9a and 9b connect to with other as shown in FIG. 6B, they need not necessarily be connected to each other.

It is preferable that the width of the grooves 9a and 9b be 200 μm or more and their depth be 20 μm or more. If the grooves 9a and 9b are narrower than 200 μm or shallower than 20 μm, they cannot sufficiently accommodate an excessive part of the liquid crystal 4 or the sealing material 3 coming out of the display area or the bonding region, and hence their intended effects may not be fully attained and a high-quality liquid crystal device may not be obtained. It is preferable that the groove depth be a half of the substrate thickness or less from the viewpoint of preventing reduction in the strength of the substrates 1 and 2.

The other part of the third embodiment is the same as the corresponding part of the first embodiment.

Embodiment 4

Figure 7A:
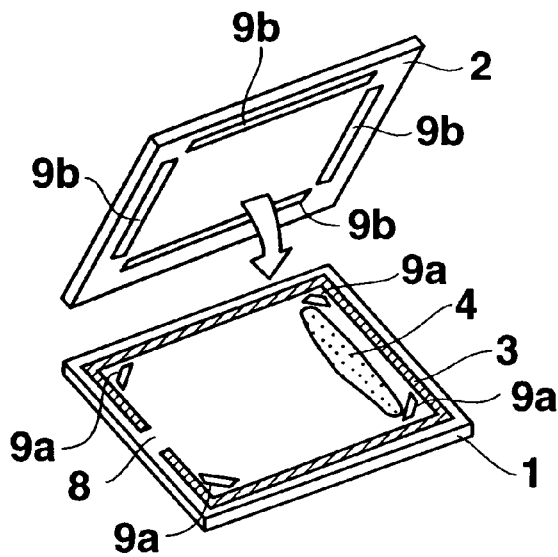
FIGS. 7A–7C are general perspective views showing, in order, steps of a manufacturing method of an active matrix liquid crystal display device according to a fourth embodiment of the invention.
Figure 7B:
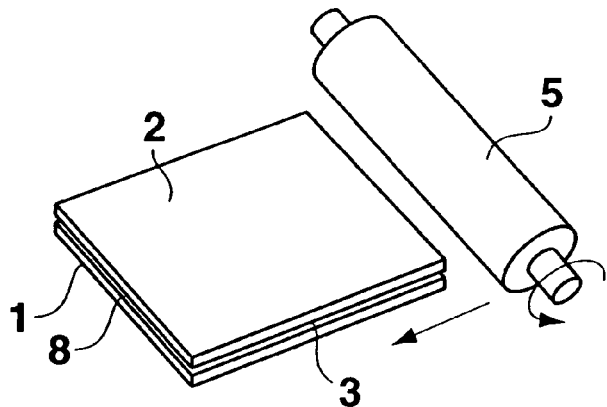
Figure 7C:
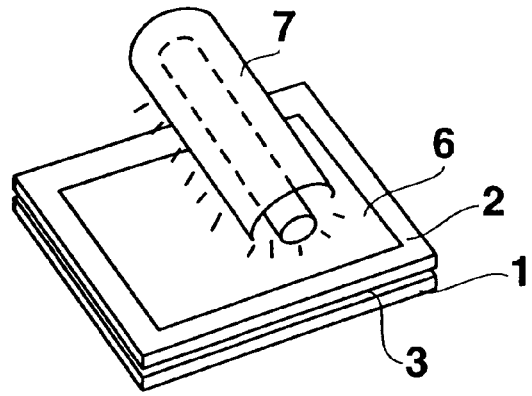

FIGS. 7A–7C show a fourth embodiment of the invention. The parts in the fourth embodiment that have corresponding parts in the first to third embodiments are given the same reference numerals as the latter.

As seen from FIGS. 7A–7C, the fourth embodiment is the same as the third embodiment except that an air ejecting portion 8 where the sealing material 3 is not applied is formed in the bonding region on the substrate 1 as in the case of the second embodiment. Therefore, the fourth embodiment provides the same advantages as the second and third embodiments.

Embodiment 5

Figure 8:
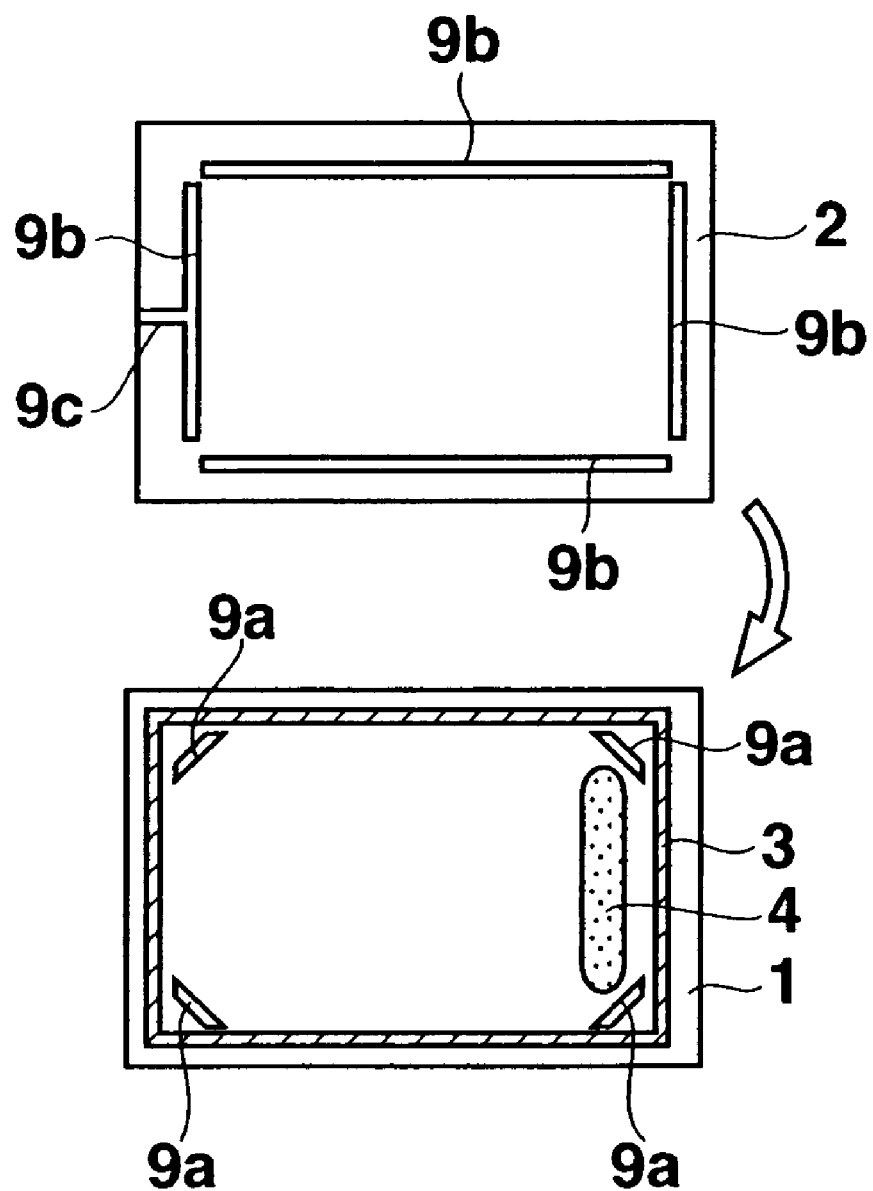
FIG. 8 is a general plan view showing structures of substrates of an active matrix liquid crystal display device according to a fifth embodiment of the invention.

FIG. 8 shows a fifth embodiment of the invention. The parts in the fifth embodiment that have corresponding parts in the first to fourth embodiments are given the same reference numerals as the latter.

As seen from FIG. 8, the fifth embodiment is the same as the third embodiment except for a groove 9c. The groove 9c is formed so as to extend to the edge of the substrate 2, and to connect to the groove 9b that is also formed in the substrate 2 along the sideline of the display area that is opposite the sideline along which the liquid crystal 4 is supplied.

The groove 9c serves as an air ejecting groove for ejecting air that is forced to escape from the liquid crystal 4 when the liquid crystal 4 is expanded by the pressure roller 5. Therefore, as in the case of the second and fourth embodiments that use the air ejecting portion 8, the fifth embodiment provides the advantages that air bubbles can be prevented effectively from remaining in the liquid crystal 4 and that a liquid crystal display device can be obtained which is free of disorder of the sealing pattern of the sealing material 3 and residual air in portions inside end adjacent to the corners of the bonding region. Further, since the groove 9c has an effect of assisting the groove 9b that communicates the groove 9c, the fifth embodiment has an additional advantage that the groove 9c can accommodate part of the liquid crystal 4 or the sealing material 3 that cannot be accommodated by the groove 9b, for instance.

As in the case of the air ejecting portion 8 in the second and fourth embodiment, the groove 9c sealed by a sealing material after the sealing material 3 is cured.

Rather than the single groove 9c, a plurality of grooves 9c may be formed in which case the grooves 9c may be formed in the substrate 1. Further, the groove 9c may be formed in curved form.

Embodiment 6

Figure 9A:
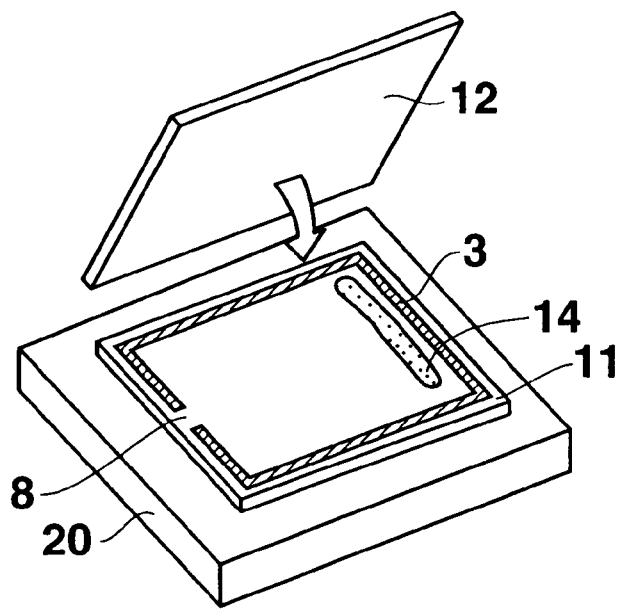
FIGS. 9A–9C are general perspective views showing, in order, steps of a manufacturing method of a passive matrix liquid crystal display device according to a sixth embodiment of the invention.
Figure 9B:
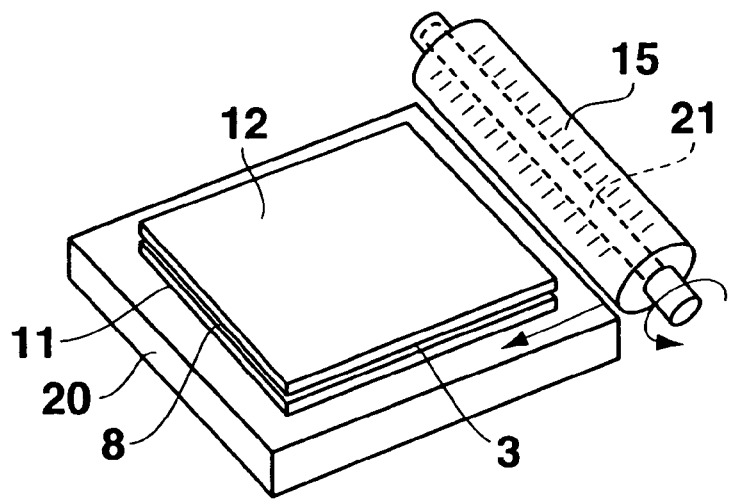
Figure 9C:
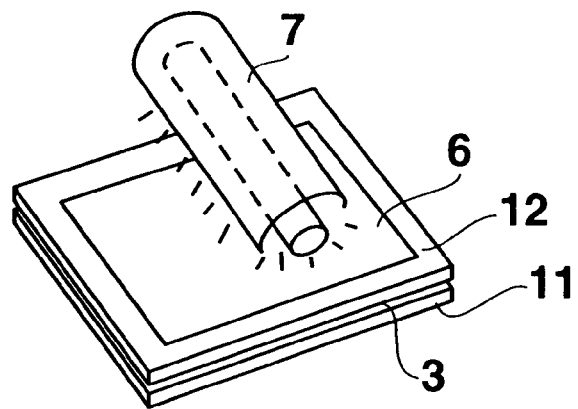

FIGS. 9A–9C show a sixth embodiment of the invention. The parts in the sixth embodiment that have corresponding parts in the first to fifth embodiments are given the same reference numerals as the latter.

The sixth embodiment is a case where the invention is applied to a manufacturing method of a passive matrix liquid crystal display device such as a liquid crystal panel using a ferroelectric liquid crystal.

First, as shown in FIG. 9A, a pair of, i.e., top and bottom, substrates 12 and 11 are prepared that will constitute a passive matrix liquid crystal display device. For example, the substrate 11 has striped transparent electrodes (see FIG. 13A) on a glass substrate as well as an alignment film (not shown) formed thereon. On the other hand, the substrate 12 has color filters (not shown), striped transparent electrodes (see FIG. 13A), and an alignment film (not shown) on a glass substrate. A passive matrix is formed when the substrates 11 and 12 are laid one on another so that the striped transparent electrodes are rendered perpendicular to each other.

Then, as shown in FIG. 9A, a ferroelectric liquid crystal 14 is dropped on one end portion of the display area of the substrate 11 in which an air ejecting portion 8 is formed in a sealing material 3 as in the case of the second embodiment. At this time, the substrate 11 is mounted on a heater-incorporated stage 20 as shown in FIG. 9A, and the ferroelectric liquid crystal 14 whose amount is accurately measured with a heat reserving dispenser, for instance, is dropped while the substrate 11 is heated to a temperature that is between the transition temperature between the smectic A phase and the cholesteric phase of the ferroelectric liquid crystal 14 and the temperature 4° C. higher than the transition temperature and that is not higher than the transition temperature between the cholesteric phase and the isotropic phase.

Further, in the above step, it is preferable that the ferroelectric liquid crystal 14 be mixed with not only spacer particles but also fine particles whose average primary particle diameter is 1 μm or less. As the present assignee already described in Japanese Unexamined Patent Publication No. Hei. 6-194693, analog gradation display can be realized in a ferroelectric liquid crystal display device while high contrast performance is maintained by having such fine particles exist in a liquid crystal, because, for instance, the dielectric constant of the fine particles causes the transmittance of the liquid crystal to vary continuously in accordance with the application voltage. Examples of usable fine particles are titanium oxide and carbon black.

If such fine particles are used in such processes as the injection method which take long time, the fine particles may cohere or sink while a liquid crystal is injected. There is almost no such possibility in the embodiment.

Then, as shown in FIG. 9B, after the substrate 12 that is heated to the same temperature as the substrate 11 is laid on the substrate 11, the liquid crystal 14 is expanded by rotating and moving, for instance, a heater-incorporated pressure roller 15 that incorporates a lamp heater 21.

In general, the ferroelectric liquid crystal has a high viscosity. Therefore, if it were expanded at a low temperature, the alignment films would be damaged due to flow resistance and the liquid crystal would not be given a uniform alignment state. In contrast, where the liquid crystal is kept in the cholesteric phase or the isotropic phase by heating the substrates 1 and 2, the viscosity of the liquid crystal 14 is sufficiently lowered and hence the alignment films are not damaged during the expansion of the liquid crystal 14. However, if the liquid crystal 14 were expanded in a state that it is in the isotropic phase or in a state that it is in the cholesteric phase but the temperature more than 4° C. higher than the transition temperature between the cholesteric phase and the smectic A phase, the alignment of the liquid crystal 14 would be disordered near the spacer particles that are used for controlling the substrate gap and inverted domains would be formed, resulting in deterioration in display quality. A high-quality liquid crystal display device that is free of alignment disorder of a liquid crystal can be obtained by expanding the ferroelectric liquid crystal 14 while heating it to a temperature that is between the transition temperature between the smectic A phase and the cholesteric phase of the ferroelectric liquid crystal 14 and the temperature 4° C. higher than the transition temperature and that is not higher than the transition temperature between the cholesteric phase and the isotropic phase.

Thereafter, as shown in FIG. 9C, the air ejecting portion 8 is sealed after the sealing material 3 is cured, in the same manner as in the second embodiment.

The other part of the sixth embodiment is the same as the corresponding part of the second embodiment.

The sixth embodiment that uses the ferroelectric liquid crystal. Since the ferroelectric liquid crystal has a memory effect, it can prevent a flicker that is problematic in CRTs (cathode ray tubes) etc. Further, capable of responding about 100 times faster than the nematic liquid crystal, the ferroelectric liquid crystal enables driving of more than 100 scanning lines even in the case of passive X-Y matrix driving as in this embodiment; that is, the driving by thin-film transistors (TFTs) is not needed. Still further, the ferroelectric liquid crystal is weak in viewing angle dependence. Thus, the sixth embodiment can provide an inexpensive, high-quality liquid crystal display device.

Because of a high viscosity of the ferroelectric liquid crystal, its injection takes very long time in the ordinary injection method. According to the sixth embodiment, the charging of the ferroelectric liquid crystal can be performed in a short time.

Embodiment 7

FIGS. 10A–10D show a seventh embodiment of the invention. The parts in the seventh embodiment that have corresponding parts in the sixth embodiment are given the same reference numerals as the latter.

The seventh embodiment is another example in which the invention is applied to a manufacturing method of a passive matrix liquid crystal device such as a liquid crystal panel as in the case of the sixth embodiment.

Figure 10A:
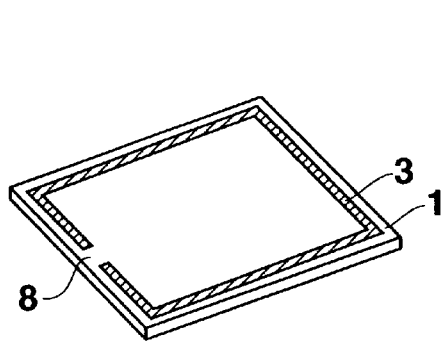
FIGS. 10A–10D are general perspective views showing, in order, steps of a manufacturing method of a passive matrix liquid crystal display device according to a seventh embodiment of the invention.
Figure 10B:
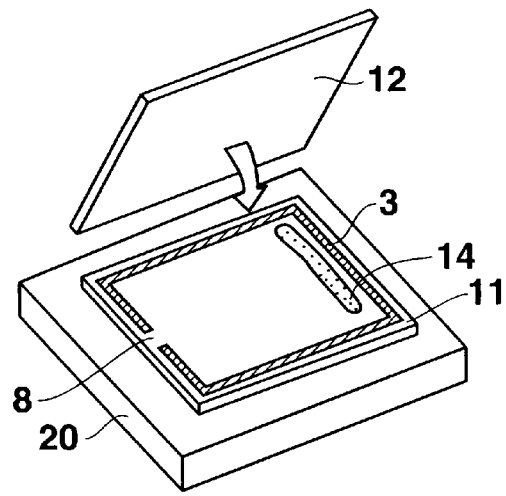

First, as shown in FIGS. 10A and 10B, a passive matrix is formed by laying the substrates 11 and 12 one on another so that the striped transparent electrodes are rendered perpendicular to each other in the same manner as in the sixth embodiment. Then, the ferroelectric liquid crystal 14 is dropped, under the same conditions as in the sixth embodiment, on one end portion of the display area of the substrate 11 in which the air ejecting portion 8 is formed in the sealing material 3.

Figure 10C:
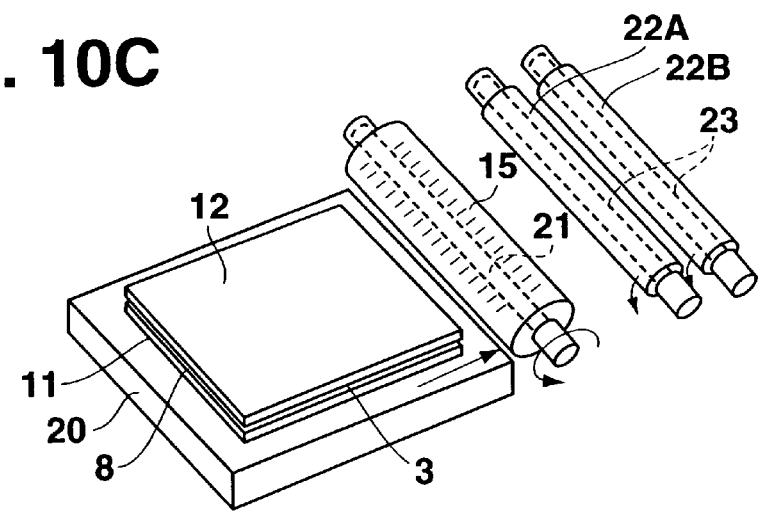

Then, as shown in FIG. 10C, the substrate 12 that is heated to the same temperature as the substrate 11 is laid on the substrate 11, and the ferroelectric liquid crystal 14 is expanded by rotating and moving, for instance, the heater-incorporated pressure toiler 15 that incorporates the lamp heater 21. Further, auxiliary pressure rollers 22A and 22B each incorporating a lamp heater 23 are rotated and moved downstream of the pressure roller 15. After the passage of the pressure roller 15, the substrates 11 and 12 are held by the auxiliary rollers 22A and 22B.

Figure 10D:
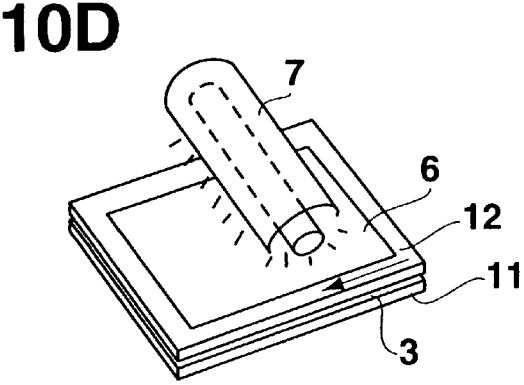

Thereafter, as shown in FIG. 10D, the air ejecting portion 8 is sealed after the sealing material 3 is cured, in the same manner as in the second embodiment.

The other part of the seventh embodiment is the same as the corresponding part of the second embodiment.

The method of distributing the spacer particles for controlling the substrate gap is not limited to mixing those in the liquid crystal 14. The spacer particles may be dispersed on at least one of the substrates 11 and 12. This may be done such that spacer particles (for example, type name "High-presica" produced by Ube-Nitto Kasei Co., Ltd.) coated with thermoplastic resin are dispersed and then fixed to the substrate by heating the substrate.

The physical properties, the kind, etc. of the ultrafine particles for giving analog gradation display capability to the ferroelectric liquid crystal 14 may be changed in various manners.

In addition to the advantages of the sixth embodiment, the seventh embodiment provides advantages that the substrates 11 and 12 are held by the auxiliary rollers 22A and 22B after the passage of the pressure roller 15, and that gap increase (gap variation) that might otherwise occur due to restitution of the sealing material 3 that has been pressed by the pressure roller 15 and has not been cured yet.

Embodiment 8

Figure 13A:
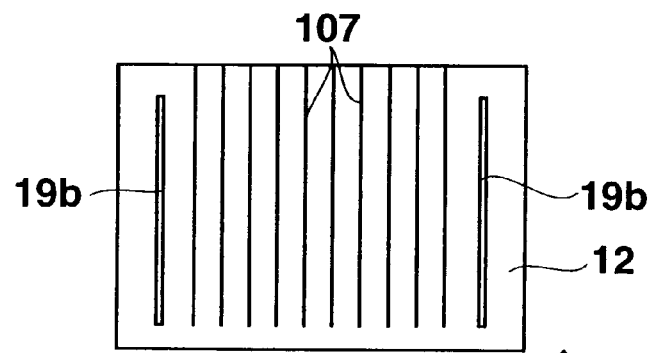
FIGS. 13A and 13B are general plan views showing structures of substrates of a passive matrix liquid crystal display device according to an eighth embodiment of the invention.
Figure 13B:
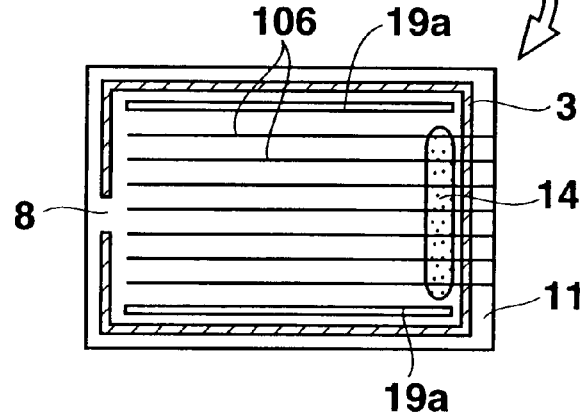
Figure 13C:
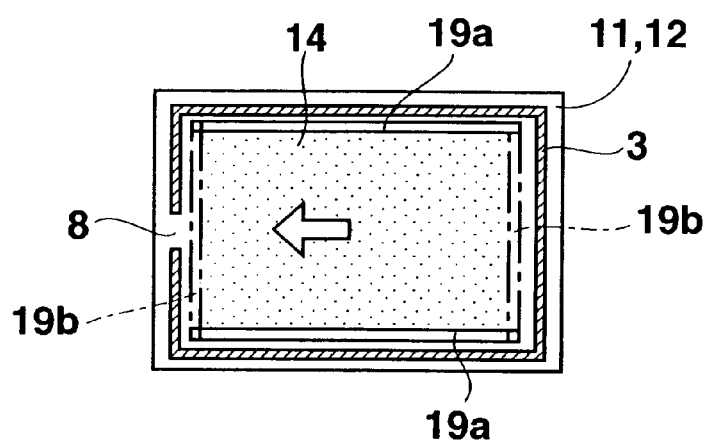

FIGS. 13A and 13B show an eighth embodiment of the invention. The parts in the eighth embodiment that have corresponding parts in the first to sixth embodiments are given the same reference numerals as the latter.

As shown in FIG. 13A, in the eighth embodiment, the opposed surfaces of the substrates are formed with grooves 19a and 19b, respectively, as in the case of the fourth embodiment in the passive matrix liquid crystal display device using the ferroelectric liquid crystal of the sixth embodiment. However, in the eighth embodiment, since striped electrodes 106 and 107 are formed on the opposed surfaces of the respective substrates 11 and 12 as shown in FIG. 13A, the grooves 19a and 19b are each provided along the two sidelines that are not associated with lead-out portions of the striped electrodes 106 and 107. Further, as shown in FIG. 13B, the grooves 19a and 19b are formed so as to overlap and connect with each other to surround the display area in closed loop form when the substrates 11 and 12 are opposed to each other.

The other part of the eighth embodiment is the same as the corresponding part of the sixth embodiment.

The eighth embodiment provides the same advantages as the fourth embodiment in addition to the advantages of the sixth embodiment.

Although the first to eighth embodiments are the cases where the invention is applied to the liquid crystal display devices (i.e., liquid crystal panels) and the manufacturing methods therefor, the invention can be applied to other cases. For example, the invention can be applied to a liquid crystal device acting like a shutter for interrupting light and a manufacturing method therefor. Further, the invention can also be applied to such a liquid crystal device as a light modulation device by analog gradation display that uses a ferroelectric liquid crystal, and a manufacturing method therefor.

EXAMPLE 1

An active matrix liquid crystal device was manufactured according to the first embodiment shown in FIGS. 1A–1C to FIGS. 3A–3B.

First, a pair of, i.e., top and bottom, substrates 1 and 2 that would constitute the active matrix liquid crystal display device according to the first embodiment were prepared.

Thereafter, a sealing portion was formed by applying a sealing material 3 ("Worldlock No. SD-11Z" produced by Kyoritsu Chemical Industry Co., Ltd.) with a dispenser so as to form a closed loop along the outer periphery of the substrate 1 as shown in FIG. 1A and then leveling it at 60° C. for 3 minutes.

Then, as shown in FIG. 1B, a liquid crystal 4 that had been mixed with spacer particles (0.05 wt %) was dropped on the substrate 1 in straight form along one sideline of the substrate 1 with the amount of the liquid crystal 4 accurately measured with a dispenser.

Then, the substrate 2 was laid on the substrate 1 so that their surfaces on which alignment films were formed were opposed to each other. This state was maintained until the liquid crystal 4 expanded due to the weight of the top substrate 2 to completely occupy the region between the liquid crystal 4 as dropped and the adjacent part of the sealing portion. Then, as shown in FIG. 1C, a 90-mm-diameter pressure roller 5 was pressed against the substrate 2 at 4 kg/cm$^2$ and rotated and moved from a position outside the part of the sealing portion adjacent to the dropped liquid crystal 4. As a result, the liquid crystal 4 was expanded uniformly so as to occupy almost completely the area inside the sealing portion. And the spacer particles that had been mixed into the liquid crystal 4 occupied the same area as the liquid crystal 4, whereby a desired gap was formed between the substrates 1 and 2.

Then, after the display area that was supplied with the liquid crystal 4 was shielded by a 0.3-mm-thick stainless steel plate 6, the sealing material 3 was cured by illuminating the entire liquid crystal display device with ultraviolet light of 90 mW/cm$^2$ for 20 seconds.

In the above manner, an active matrix liquid crystal display device was manufactured in a very short time. Although air bubbles slightly remained in a portion close to the part of the sealing portion opposite the side of the dropping of the liquid crystal 4 and the sealing pattern was somewhat disordered by those air bubbles, no minute air bubbles remained in the display area.

13

EXAMPLE 2

An active matrix liquid crystal device was manufactured according to the second embodiment shown in FIGS. 4A–4C.

First, a pair of, i.e., top and bottom, substrates 1 and 2 that would constitute an active matrix liquid crystal display device were prepared in the same manner as in Example 1.

Thereafter, as shown in FIG. 4A, a sealing material 3 ("Worldlock No. SD-11Z" produced by Kyoritsu Chemical Industry Co., Ltd.) was applied to an outer peripheral portion of the substrate 1 with a dispenser. At this time, an air ejecting portion 8 was formed in the sealing portion at a position adjacent to one sideline of the substrate 1. The sealing material 3 was then leveled by heating the substrate 1 at 60° C. for 3 minutes.

Then, a liquid crystal 4 that had been mixed with spacer particles (0.05 wt %) was dropped on the substrate 1 in straight form inside the sealing portion along the one sideline of the substrate 1 opposite the sideline that was associated with the air ejecting portion 8 with the amount of the liquid crystal 4 accurately measured with a dispenser.

Then, after the substrate 2 was laid on the substrate 1 so that their surfaces on which alignment films were formed were opposed to each other, a pressure roller 5 was rotated and moved under the same conditions as in Example 1 as shown in FIG. 4B. As a result, the liquid crystal 4 was expanded uniformly so as to occupy the entire area inside the sealing portion. And the spacer particles that had been mixed into the liquid crystal 4 occupied the same area as the liquid crystal 4, whereby a desired gap was formed between the substrates 1 and 2.

Then, after the sealing material 3 was cured in the same manner as in Example 1 as shown in FIG. 4C, the air ejecting portion 8 was sealed by applying a sealing material there.

In the above manner, an active matrix liquid crystal display device was manufactured in a very short time. No disorder was found in the sealing pattern, and no minute air bubbles remained in the area inside the sealing portion including the display area.

EXAMPLE 3

An active matrix liquid crystal device was manufactured according to the third embodiment shown in FIGS. 5A–5B to FIGS. 6A–6C.

First, a pair of, i.e., top and bottom, substrates 1 and 2 that would constitute the active matrix liquid crystal device were prepared basically in the same manner as in Example 1.

As shown in FIG. 5A, prior to formation of alignment films on the substrates 1 and 2, grooves 9a of 1 mm in width and 100 $\mu$m were formed in the substrate 1 in the four corners of the substrate 1 inside the sealing portion so as not to interfere with lead-out portions of matrix pixel electrodes. On the other hand, the opposed surface of the substrate 2 was formed with straight grooves 9b of 1 mm in width and 100 $\mu$m along the respective sidelines of the substrate 2 so as to be located inside the sealing portion. The positions and the lengths of the grooves 9a and 9b were determined so that their projections on the substrate 1 or 2 when the substrates 1 and 2 would be opposed to each other formed a closed loop that was inside the sealing portion and surrounded the display area, as shown in FIG. 6B.

Thereafter, a sealing material 3 ("Worldlock No. SD-1Z" produced by Kyoritsu Chemical Industry Co., Ltd.) was applied to the substrate 1 with a dispenser so as to form a closed loop along the outer periphery of the substrate 1 as shown in FIG. 5A, and then leveled at 60° C. for 3 minutes.

14

Then, as shown in FIG. 5B, a liquid crystal 4 that had been mixed with spacer particles (0.05 wt %) was dropped with a dispenser on the substrate 1 in straight form along one sideline of the substrate 1 inside the position that would be covered with one of the grooves 9b that were formed in the substrate 2. At this time, the amount of the liquid crystal 4 was measured roughly so that the liquid crystal 4 would be dropped by a little more than the necessary amount.

Then, the substrate 2 was laid on the substrate 1 so that their surfaces on which alignment films were formed were opposed to each other. This state was maintained until the liquid crystal 4 expanded due to the weight of the top substrate 2 to reach the adjacent grooves 9a and 9b. Then, as shown in FIG. 6A, a 90-mm-diameter pressure roller 5 was pressed against the substrate 2 at 4 kg/cm$^2$ and rotated and moved from a position outside the part of the sealing portion adjacent to the dropped liquid crystal 4. As a result, the liquid crystal 4 was expanded uniformly so as to occupy the entire display area surrounded by the grooves 9a and 9b. An excessive part of the liquid crystal 4 fell into the grooves 9a and 9b and did not reach the sealing portion. And the spacer particles that had been mixed into the liquid crystal 4 occupied the same area as the liquid crystal 4, whereby a desired gap was formed between the substrates 1 and 2.

Figure 6C:
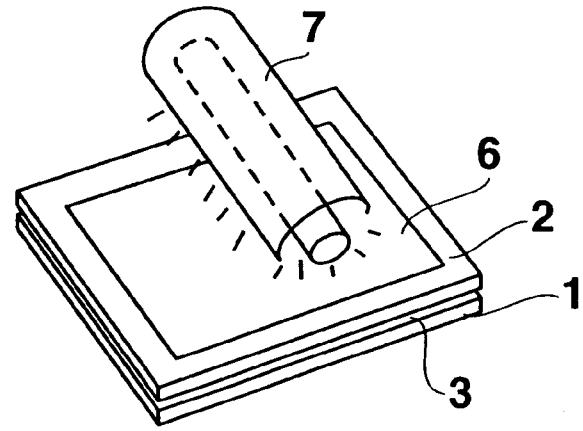

Then, the sealing material 3 was cured in the same manner as in Example 1 as shown in FIG. 6C.

In the above manner, an active matrix liquid crystal display device was manufactured in a very short time. No minute air bubbles remained in the area surrounded by the grooves 9a and 9b including the display area.

EXAMPLE 4

An active matrix liquid crystal display device was manufactured according to the fourth embodiment shown in FIGS. 7A–7C.

First, a pair of, i.e., top and bottom, substrates 1 and 2 that were formed with the grooves 9a and 9b at an outer peripheral portion and would constitute an active matrix liquid crystal device were prepared in the same manner as in Example 3.

Then, as shown in FIG. 7A, a sealing material 3 ("Worldlock No. SD-11Z" produced by Kyoritsu Chemical Industry Co., Ltd.) was applied to an outer peripheral portion of the substrate 1 with a dispenser. At this time, an air ejecting portion 8 was formed in the sealing portion at a position adjacent to one sideline of the substrate 1. The sealing material 3 was then leveled by heating the substrate 1 at 60° C. for 3 minutes.

Then, a liquid crystal 4 that had been mixed with spacer particles (0.05 wt %) was dropped on the substrate 1 in straight form inside the sealing portion along the one sideline of the substrate 1 opposite the sideline that was associated with the air ejecting portion 8. At this time, the amount of the liquid crystal 4 was measured roughly so that the liquid crystal 4 would be dropped by a little more than the necessary amount.

Then, the substrate 2 was laid on the substrate 1 so that their surfaces on which alignment films were formed were opposed to each other. This state was maintained until the liquid crystal 4 expanded due to the weight of the top substrate 2 to reach the adjacent grooves 9a and 9b. Then, as shown in FIG. 7B, a 90-mm-diameter pressure roller 5 was pressed against the substrate 2 at 4 kg/cm$^2$ and rotated and moved from a position outside the part of the sealing portion adjacent to the dropped liquid crystal 4. As a result, the liquid crystal 4 was expanded uniformly so as to occupy the entire display area surrounded by the grooves 9a and 9b. An excessive part of the liquid crystal 4 fell into the grooves 9a and 9b and did not reach the sealing portion. And the spacer particles that had been mixed into the liquid crystal 4 occupied the same area as the liquid crystal 4, whereby a desired gap was formed between the substrates 1 and 2.

Then, after the sealing material 3 was cured in the same manner as in Example 1 as shown in FIG. 7C, the air ejecting portion 8 that was formed in the sealing portion was sealed by applying a sealing material there.

In the above manner, an active matrix liquid crystal display device was manufactured in a very short time. No minute air bubbles remained in the area surrounded by the grooves 9a and 9b including the display area.

EXAMPLE 5

An active matrix liquid crystal display device was manufactured according to the fifth embodiment shown in FIG. 8.

First, a pair of, i.e., top and bottom, substrates 1 and 2 that were formed with the grooves 9a and 9b at an outer peripheral portion were prepared basically in the same manner as in Example 3. As shown in FIG. 8, the substrate 2 was further formed with a groove 9c of 1 mm in width and 100 μm in depth that extended from one of the grooves 9b and reached the associated edge of the substrate 2.

Thereafter, a sealing material 3 ("Worldlock No. SD-11Z" produced by Kyoritsu Chemical Industry Co., Ltd.) was applied to the substrate 1 with a dispenser so as to form a closed loop along the outer periphery of the substrate 1, and then leveled by heating the substrate 1 at 60° C. for 3 minutes.

Then, a liquid crystal 4 that had been mixed with spacer particles (0.05 wt %) was dropped with a dispenser on the substrate 1 in straight form along one sideline of the substrate 1 inside the position that would be covered with one of the grooves 9b that were formed in the substrate 2, the one sideline being opposite the sideline of the substrate 1 that would be opposed to the sideline of the substrate 2 that is associated with the groove 9c. At this time, the amount of the liquid crystal 4 was measured roughly so that the liquid crystal 4 would be dropped by a little more than the necessary amount.

Then, the substrate 2 was laid on the substrate 1 so that their surfaces on which alignment films were formed were opposed to each other. This state was maintained until the liquid crystal 4 expanded due to the weight of the top substrate 2 to reach the adjacent grooves 9a and 9b. Then, a 90-mm-diameter pressure roller 5 was pressed against the substrate 2 at 4 kg/cm² and rotated and moved from a position outside the part of the sealing portion adjacent to the dropped liquid crystal 4. As a result, the liquid crystal 4 was expanded uniformly so as to occupy the entire display area surrounded by the grooves 9a and 9b. An excessive part of the liquid crystal 4 fell into the grooves 9a and 9b and did not reach the sealing portion. And the spacer particles that had been mixed into the liquid crystal 4 occupied the same area as the liquid crystal 4, whereby a desired gap was formed between the substrates 1 and 2.

Then, after the sealing material 3 was cured in the same manner as in Example 1, the groove 9c that was formed in the substrate 2 was sealed by applying a sealing material to its opening portion.

In the above manner, an active matrix liquid crystal display device was manufactured in a very short time. No minute air bubbles remained in the area surrounded by the grooves 9a and 9b including the display area.

EXAMPLE 6

A passive matrix liquid crystal display device using a ferroelectric liquid crystal was manufactured according to the sixth embodiment shown in FIGS. 9A–9C.

First, a pair of, i.e., top and bottom, substrates 11 and 12 were prepared which would constitute a passive matrix liquid crystal display device according to the sixth embodiment. SiO oblique evaporation films were formed as alignment films with the evaporation angle set at 85° with respect to the normal to the substrate 11 or 12.

Then, as shown in FIG. 9A, a sealing material 3 ("Worldlock No. SD-11Z" produced by Kyoritsu Chemical Industry Co., Ltd.) was applied to an outer peripheral portion of the substrate 11 with a dispenser. At this time, an air ejecting portion 8 was formed in the sealing portion at a position adjacent to one sideline of the substrate 11. The sealing material 3 was then leveled by heating the substrate 11 at 60° C. for 3 minutes.

Then, while the substrate 11 was heated to a temperature that is 2° C. higher than the transition temperature between the smectic A phase and the cholesteric phase of a ferroelectric liquid crystal 14, the ferroelectric liquid crystal 14 that had been mixed with spacer particles (0.05 wt %) was dropped on the substrate 11 in straight form along the sideline of the substrate 11 that is opposite the sideline associated with the air ejecting portion 8 at a position inside the sealing portion. At this time, by using a heat reserving dispenser, the ferroelectric liquid crystal 14 was kept at a temperature of the cholesteric phase and its amount was accurately measured.

Then, the substrate 12 that was heated in advance to the same temperature as the substrate 11 was laid on the substrate 11 so that their surfaces on which alignment films were formed were opposed to each other. This state was maintained until the ferroelectric liquid crystal 14 expanded due to the weight of the top substrate 12 to completely occupy the region between the ferroelectric liquid crystal 14 as dropped and the adjacent part of the sealing portion. Then, as shown in FIG. 9B, a 90-mm-diameter pressure roller 15 that incorporated a lamp heater 21 and was heated to the same temperature as the substrate 11 was pressed against the substrate 12 at 6 kg/cm² and rotated and moved from a position outside the part of the sealing portion adjacent to the dropped ferroelectric liquid crystal 14. As a result, the ferroelectric liquid crystal 14 was expanded uniformly so as to occupy almost completely the area inside the sealing portion. And the spacer particles that had been mixed into the liquid crystal 4 occupied the same area as the liquid crystal 4, whereby a desired gap was formed between the substrates 11 and 12.

Then, after the sealing material 3 was cured in the same manner as in Example 1 as shown in FIG. 9C, the air ejecting portion 8 was sealed by applying a sealing material there.

In the above manner, a passive matrix liquid crystal display device was manufactured in a very short time. No disorder was found in the sealing pattern, and no minute air bubbles remained in the area inside the sealing portion including the display area. Further, no inverted domains existed in the vicinity of the spacer particles and highly uniform display characteristics were obtained.

EXAMPLE 7

A passive matrix liquid crystal display device using a ferroelectric liquid crystal was manufactured according to the seventh embodiment shown in FIGS. 10A–10D.

First, a pair of, i.e., top and bottom, substrates 11 and 12 were prepared which would constitute a passive matrix liquid crystal display device according to the seventh embodiment. SiO oblique evaporation films were formed as alignment films with the evaporation angle set at 85° with respect to the normal to the substrate 11 or 12.

As a feature that is not included in the seventh embodiment, prior to the formation of the alignment films, grooves of 2 mm in width and 100 μm in depth were formed in the substrates 11 and 12 along two sidelines that were not associated with lead-out portions of striped transparent electrodes at positions that would become inside a sealing portion, as shown in FIG. 13A. The positions and the lengths of the grooves were determined so that their projections on the substrate 11 or 12 when the substrates 11 and 12 would be opposed to each other formed a closed loop that was inside the sealing portion and surrounded the display area, as shown in FIG. 10C (see FIG. 13B).

Then, a sealing material 3 (UV curable type, No. 3025H, G produced by Three Bonds Co., Ltd.) was applied with a dispenser to an outer peripheral portion of the substrate 11 at a line width of 200614 500 μm and a height of 25–60 μm. At this time, an air ejecting portion 8 was formed in a part of the sealing portion along one sideline of the substrate 11.

Then, after a ferroelectric liquid crystal 14 that had been mixed with titanium oxide ultrafine particles (0.01 wt %; type name "ITOD" produced by Idemitsu Kosan Co., Ltd.) was subjected to ultrasonic dispersion in a state that it was heated to the N-phase temperature range (105° C–108° C.) in a heat preserving dispenser, it was dropped in straight form (line width: 2 mm; length: 40–50 mm; and height: 50–200 μm) along the sideline of the substrate 11 that is opposite the sideline associated with the air ejecting portion 8 at a position inside the sealing portion.

Then, the substrate 12 that was heated in advance to the same temperature as the substrate 11 was laid on the substrate 11 so that their surfaces on which alignment films were formed were opposed to each other. This state was maintained until the ferroelectric liquid crystal 14 expanded due to the weight of the top substrate 12 to reach the adjacent grooves. Then, a 70-mm-diameter pressure roller 15 that incorporated a lamp heater and was heated to the same temperature as the substrate 11 was pressed against the substrate 12 at 10 kg/cm² and rotated and moved from a position outside the part of the sealing portion adjacent to the dropped ferroelectric liquid crystal 14.

The preset pressure of the pressure roller 15 is maintained by an axle weight servo (not shown). After the passage of the pressure roller 15, the substrate 12 is held by auxiliary rollers 22A and 22B.

As a result, the ferroelectric liquid crystal 14 was expanded uniformly so as to occupy the entire area surrounded by the grooves. An excessive part of the ferroelectric liquid crystal 14 fell into the grooves and did not reach the sealing portion. A desired gap was thus formed between the substrates 1 and 2.

Then, after the sealing material 3 was cured in the same manner as in Example 1, the air ejecting portion 8 was sealed by applying a sealing material there.

Figure 11:
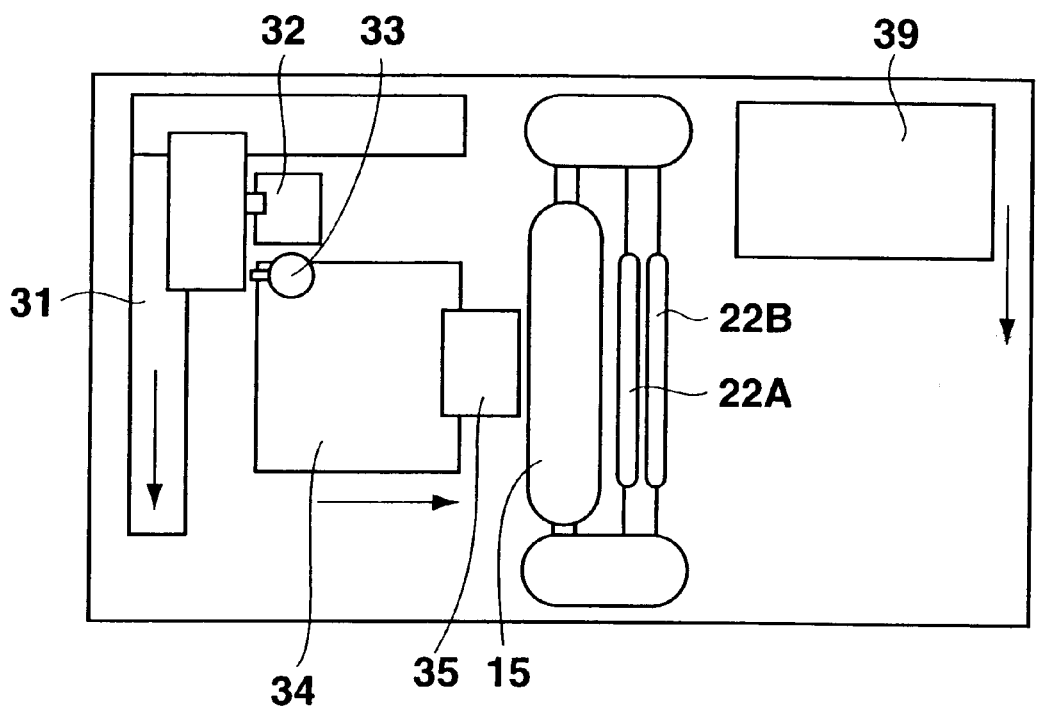
FIG. 11 generally shows a manufacturing apparatus of a passive matrix liquid crystal display device according to Example 7.

The above-described liquid crystal display device of Example 7 was manufactured by a manufacturing apparatus generally shown in FIG. 11.

First, after the substrate 11 was mounted on a movable table 34 by a transfer robot 32 that is driven by an XY robot 31, the sealing material 3 and the ferroelectric liquid crystal 14 were applied to the substrate 11 in the predetermined patterns with a dispenser robot 33. Then, the substrate 12 that was heated in advance to the same temperature as the substrate 11 was laid on the substrate 11. After the liquid crystal 14 was expanded to the adjacent grooves by the weight of the substrate 12, the top and bottom substrates 12 and 11 were kept at a given temperature by a heat preserving dispenser 35, and the 70-mm-diameter pressure roller 15 was pressed against the substrate 12 at 10 kg/cm² or less while the movable table 34 was moved in the direction indicated by the arrow (Y direction). Subsequently, the substrates 11 and 12 were passed under the auxiliary rollers 22A and 22B to reach a predetermined position.

During the movement by the movable table 34, the pressure roller 20 exerted the predetermined pressure on the substrates 11 and 12 and then the auxiliary rollers 22A and 22B exerted pressure on and held the substrate 11 and 12. Thereafter, at the predetermined position, the substrates 11 and 12 on the movable table 34 were illuminated from above with ultraviolet light by moving a UV lamp unit 39 in the direction indicated by the arrow, whereby the sealing material 3 was cured. Then, the air ejecting portion 8 of the sealing material 3 was sealed by applying a sealing material there. At this time, the display area that is supplied with the liquid crystal 14 was shielded by a 0.3-mm-thick stainless steel plate and the entire substrates 11 and 12 were illuminated at 90 mW/cm² for 20 seconds.

Figure 12:
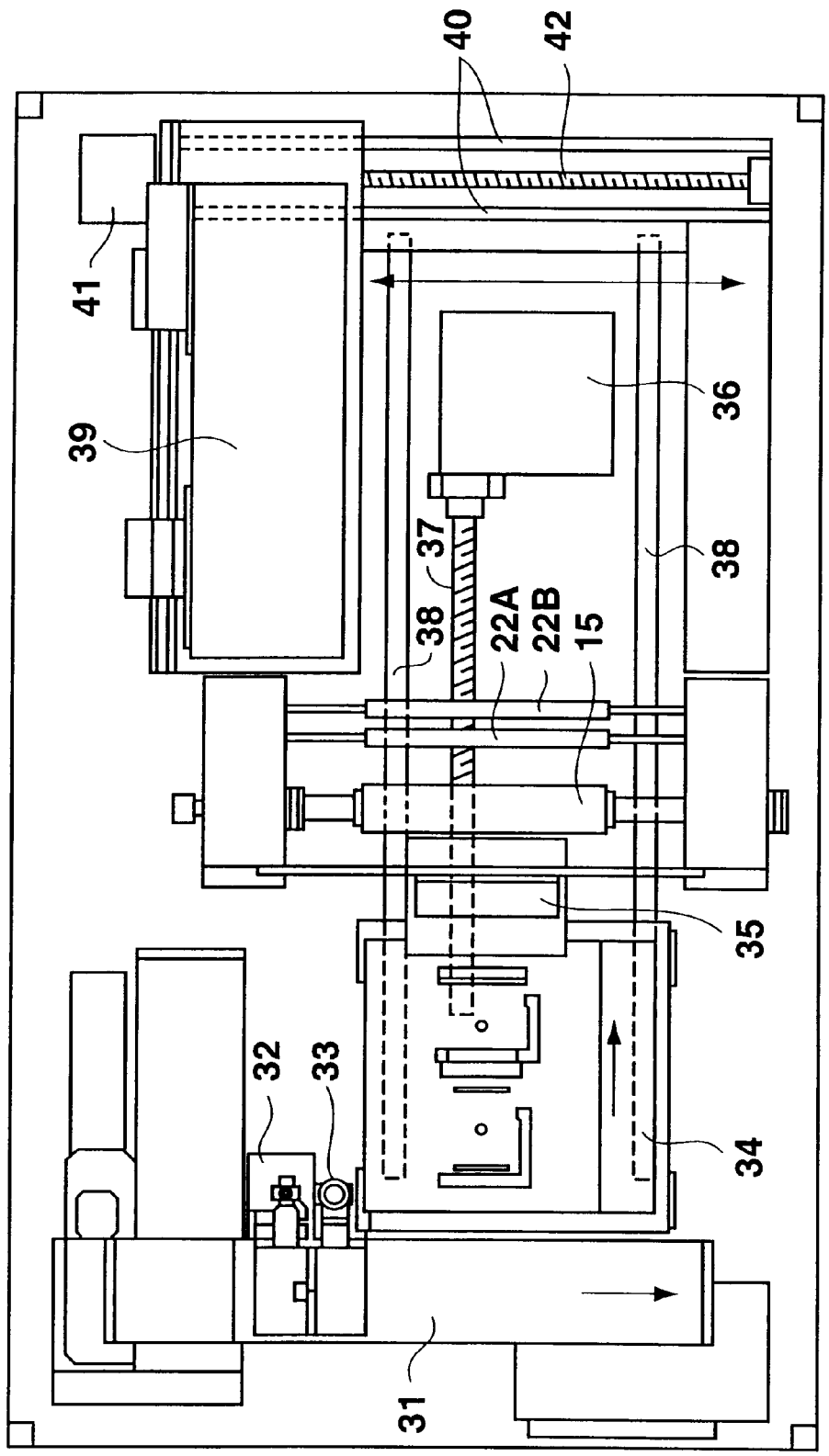
FIG. 12 is a detailed plan view of the manufacturing apparatus of FIG. 11.

FIG. 12 is a detailed plan view of the manufacturing apparatus of FIG. 11. The unit temperature of the movable table 34 is kept in a +1° C. range. The transfer robot 32, which is moved by the XY robot 31, is reciprocated between the initial position and the movable table 34 by a driving mechanism (not shown). On the other hand, the movable table 34 is connected to a feed shaft 37 that is rotated by a driving source 36, when driven by the rotation of the feed shaft 37 the movable table 34 is moved on rails 38 to the position above the driving source 36. The pressure roller 15 has an axle servo mechanism. Each of the pressure roller 15 and the auxiliary rollers 22A and 22B is made of a heat-resistant silicone material.

The UV lamp unit 39 is connected to a feed shaft 42 that is rotated by a driving source 41. Supported by rails 40, the UV lamp unit 39 illuminates the substrates 11 and 12 on the movable table 34 that is located above the driving source 36. After completion of the illumination, the movable table 34 and the UV lamp unit 39 return to the original positions.

In the above manner, a passive matrix liquid crystal display device was manufactured in a very short time. No disorder was found in the sealing pattern, and no minute air bubbles remained in the display area surrounded by the grooves. Further, no inverted domains existed in the vicinity of the spacer particles and highly uniform display characteristics were obtained.

EXAMPLE 8

A passive matrix liquid crystal display device using a ferroelectric liquid crystal was manufactured according to the eighth embodiment shown in FIGS. 13A and 13B.

First, a pair of, i.e., top and bottom, substrates 11 and 12 were prepared which would constitute a passive matrix liquid crystal display device in the same manner as in Examples 6 and 7.

Prior to the formation of the alignment films, grooves 19a and 19b of 1 mm in width and 100 μm in depth were formed in the substrates 11 and 12 along two sidelines that were not associated with lead-out portions of striped transparent electrodes 106 and 107 at positions that would become inside a sealing portion, as shown in FIG. 13A. The positions and the lengths of the grooves 19a and 19b were determined so that their projections on the substrate 11 or 12 when the substrates 11 and 12 would be opposed to each other formed a closed loop that was inside the sealing portion and surrounded the display area, as shown in FIG. 13B.

Then, a sealing material 3 ("Worldlock No. SD-11Z" produced by Kyoritsu Chemical Industry Co., Ltd.) was applied to an outer peripheral portion of the substrate 11 with a dispenser. At this time, an air ejecting portion 8 was formed in the sealing portion at a position adjacent to one sideline of the substrate 11. The sealing material 3 was then leveled by heating the substrate 11 at 60° C. for 3 minutes.

Then, while the substrate 11 was heated to a temperature that is 2° C. higher than the transition temperature between the smectic A phase and the cholesteric phase of a ferroelectric liquid crystal 14, the ferroelectric liquid crystal 14 that had been mixed with spacer particles (0.05 wt %) was dropped on the substrate 11 in straight form along the sideline of the substrate 11 that is opposite the sideline associated with the air ejecting portion 8 at a position inside the sealing portion. At this time, by using a heat reserving dispenser, the ferroelectric liquid crystal 14 was kept at a temperature of the cholesteric phase and its amount was measured roughly so that the ferroelectric liquid crystal 14 would be dropped by a little more than the necessary amount.

Then, the substrate 12 that was heated in advance to the same temperature as the substrate 11 was laid on the substrate 11 so that their surfaces on which alignment films were formed were opposed to each other. This state was maintained until the ferroelectric liquid crystal 14 expanded due to the weight of the top substrate 12 to reach the adjacent grooves 19a and 19b. Then, a 90-mm-diameter pressure roller that incorporated a lamp heater and was heated to the same temperature as the substrate 11 was pressed against the substrate 12 at 6 kg/cm$^2$ and rotated and moved from a position outside the part of the sealing portion adjacent to the dropped ferroelectric liquid crystal 14. As a result, the ferroelectric liquid crystal 14 was expanded uniformly so as to occupy the entire area surrounded by the grooves 19a and 19b. An excessive part of the ferroelectric liquid crystal 14 fell into the grooves 19a and 19b and did not reach the sealing portion. And the spacer particles that had been mixed into the liquid crystal 14 occupied the same area as the liquid crystal 4, whereby a desired gap was formed between the substrates 11 and 12.

Then, after the sealing material 3 was cured in the same manner as in Example 1, the air ejecting portion 8 was sealed by applying a sealing material there.

In the above manner, a passive matrix liquid crystal display device was manufactured in a very short time. No minute air bubbles remained in the area surrounded by the grooves 19a and 19b and including the display area. Further, no inverted domains existed in the vicinity of the spacer particles and highly uniform display characteristics were obtained.

EXAMPLE 9

First, a pair of, i.e., top and bottom, substrates that are formed with grooves in an outer peripheral portion and would constitute a passive matrix liquid crystal device were prepared in the same manner as in Example 8.

Then, a sealing material ("Worldlock No. SD-11Z" produced by Kyoritsu Chemical Industry Co., Ltd.) was applied to an outer peripheral portion of the bottom substrate with a dispenser. At this time, an air ejecting portion was formed in the sealing portion at a position adjacent to one sideline of the bottom substrate. The sealing material was then leveled by heating the bottom substrate at 60° C. for 3 minutes.

Then, while the bottom substrate was heated to a temperature that is 2° C. higher than the transition temperature between the smectic A phase and the cholesteric phase of a ferroelectric liquid crystal, the ferroelectric liquid crystal that had been mixed with spacer particles (0.05 wt %; type name "IT-OD" produced by Idemitsu Kosan Co., Ltd.) was dropped on the bottom substrate in straight form along the sideline of the substrate that is opposite the sideline associated with the air ejecting portion at a position inside the sealing portion. At this time, by using a heat reserving dispenser, the ferroelectric liquid crystal was kept at a temperature of the cholesteric phase and its amount was measured roughly so that the ferroelectric liquid crystal would be dropped by a little more than the necessary amount.

Then, the two substrates were laid one on another in the same manner as in Example 8, and a pressure roller was pressed against the top substrate and rotated and moved in the same manner as in Example 8. As a result, the ferroelectric liquid crystal was expanded uniformly so as to occupy the entire area surrounded by the grooves. An excessive part of the ferroelectric liquid crystal fell into the grooves and did not reach the sealing portion. And the spacer particles that had been mixed into the liquid crystal occupied the same area as the liquid crystal, whereby a desired gap was formed between the substrates.

Then, after the sealing material was cured in the same manner as in Example 1, the air ejecting portion was sealed by applying a sealing material there.

In the above manner, a passive matrix liquid crystal display device capable of analog gradation display and display of very high quality was manufactured in a very short time. No minute air bubbles remained in the area surrounded by the grooves and including the display area. Further, no inverted domains existed in the vicinity of the spacer particles and highly uniform display characteristics were obtained.

EXAMPLE 10

The steps to the expansion of the liquid crystal was executed in the same manner as in Example 4 except that "Worldlock No. 780B-B" produced by Kyoritsu Chemical Industry Co., Ltd. was used as the sealing material and prebaking was performed at 90° C. for 5 minutes.

Then, the sealing material was cured by heating it at 105° C. for 10 minutes while uniformly pressing the substrates from above and below at 1 kg/cm$^2$ by hot press. Thereafter, the air ejecting portion was sealed by applying a sealing material there.

In the above manner, an active matrix liquid crystal display device was manufactured in a very short time. The uniformity of the substrate gap in the display area was very good, and no minute air bubbles remained in the area surrounded by the grooves and including the display area.

EXAMPLE 11

The steps to the expansion of the liquid crystal was executed in the same manner as in Example 9 except that "Worldlock No. 780B-B" produced by Kyoritsu Chemical Industry Co., Ltd. was used as the sealing material and prebaking was performed at 90° C. for 5 minutes.

Then, the sealing material was cured by heating it at 105° C. for 10 minutes while uniformly pressing the substrates from above and below at 1 kg/cm² by hot press. Thereafter, the air ejecting portion was sealed by applying a sealing material there.

In the above manner, a passive matrix liquid crystal display device capable of analog gradation display and display of very high quality was manufactured in a very short time. The uniformity of the substrate gap in the display area was very good, and no minute air bubbles remained in the area surrounded by the grooves and including the display area. Further, no inverted domains existed in the vicinity of the spacer particles and highly uniform display characteristics were obtained.

As described above, according to the invention, since a liquid crystal that is supplied to one end portion of a pair of substrates is expanded to occupy the space between the substrates by pressing the substrates by a pressing means such as a pressure roller after the substrates are laid one on another, the charging of the liquid crystal can be performed very simply in a short time. If the pressure of the pressing means is properly adjusted and this pressurized state is maintained by auxiliary rollers, a desired substrate gap can be obtained. Further, since air bubbles involved in the liquid crystal are forced to escape therefrom as the liquid crystal expands, no minute air bubbles remain in the liquid crystal region. Therefore, it becomes possible to manufacture a liquid crystal having superior characteristics by a simple manufacturing process that takes only a short time. Further, the manufacturing cost can be reduced because it is no longer necessary to use an expensive vacuum apparatus unlike the conventional cases.

In general, the invention is particularly effective when applied to the case where the space between the substrates is filled with a highly viscous ferroelectric liquid crystal. For example, the use of a ferroelectric liquid crystal enables provision of an inexpensive liquid crystal device that does not use expensive thin-film transistors.

What is claimed is:

1. A manufacturing method of a liquid crystal device in which a pair of substrates that are opposed to each other with a predetermined gap are fixed to each other at a bonding region that is provided along an outer periphery of the substrates and a liquid crystal is sealed between the substrates in a liquid crystal area that is inside the bonding region, comprising the steps of:

applying a curable adhesive to at least one of the substrates in the bonding region;

supplying a liquid crystal to one end portion, in the liquid crystal area, of at least one of the substrates by a predetermined amount;

opposing the substrates to each other with the curable adhesive and the liquid crystal interposed in between;

expanding the liquid crystal from the one end portion to cover the entire liquid crystal area by exerting pressure on at least one of the opposed substrates from the one end portion to the other end portion in the liquid crystal area by a pressing means while moving the pressing means relative to the substrates; and curing the curable adhesive, wherein the liquid crystal area is a display area, in the expanding step a pressure roller is rotated and moved on the at least one of substrates from the one end portion to the other end portion, whereby the liquid crystal is expanded from the one end portion to occupy the entire liquid crystal area, in the expanding step the pressure roller exerts pressure on the at least one substrate as the substrates are relatively moved, and a resulting pressurized state of the substrate is maintained by an auxiliary roller.

2. The manufacturing method according to claim 1, wherein in the expanding step the pressing means is moved from a position that is outside the one end portion and close to an edge of the at least one substrate.

3. The manufacturing method according to claim 1, wherein the auxiliary roller has a smaller diameter than the pressure roller.

4. The manufacturing method according to claim 1, wherein the liquid crystal is a ferroelectric liquid crystal.

5. The manufacturing method according to claim 4, wherein the liquid crystal is mixed with fine particles having an average primary particle diameter of 1 $\mu$m or less.

6. The manufacturing method according to claim 4, wherein in the expanding step the substrates are heated to a temperature that is between a transition temperature between a smectic A phase and a cholesteric phase of the liquid crystal and a temperature 4° C. higher than the transition temperature and that is not higher than a transition temperature between the cholesteric phase and an isotropic phase of the liquid crystal.

7. The manufacturing method according to claim 1, wherein after the expanding step the curable adhesive is cured while or after pressure is exerted uniformly on both outer surfaces of the opposed substrates.

8. A manufacturing method of a liquid crystal device in which a pair of substrates that are opposed to each other with a predetermined gap are fixed to each other at a bonding region that is provided along an outer periphery of the substrates and a liquid crystal is sealed between the substrates in a liquid crystal area that is inside the bonding region, comprising the steps of:

applying a curable adhesive to at least one of the substrates in the bonding region;

supplying a liquid crystal to one end portion, in the liquid crystal area, of at least one of the substrates by a predetermined amount;

opposing the substrates to each other with the curable adhesive and the liquid crystal interposed in between;

expanding the liquid crystal from the one end portion to cover the entire liquid crystal area by exerting pressure on at least one of the opposed substrates from the one end portion to the other end portion in the liquid crystal area by a pressing means while moving the pressing means relative to the substrates; and curing the curable adhesive, wherein, in the applying step at least one air ejecting portion where the curable adhesive is not applied is formed in the vicinity of the other end portion, and the pressing means comprises a pressure roller which exerts pressure on the at least one substrate as the substrates are relatively moved and an auxiliary roller which maintains resulting pressurized state of the substrates.

9. A manufacturing method of a liquid crystal device in which a pair of substrates that are opposed to each other with a predetermined gap are fixed to each other at a bonding region that is provided along an outer periphery of the substrates and a liquid crystal is sealed between the substrates in a liquid crystal area that is inside the bonding region, comprising the steps of:

applying a curable adhesive to at least one of the substrates in the bonding region;

supplying a liquid crystal to one end portion, in the liquid crystal area of at least one of the substrates by a predetermined amount;

opposing the substrates to each other with the curable adhesive and the liquid crystal interposed in between;

expanding the liquid crystal from the one end portion to cover the entire liquid crystal area by exerting pressure on at least one of the opposed substrates from the one end portion to the other end portion in the liquid crystal area by a pressing means while moving the pressing means relative to the substrates; and curing the curable adhesive, wherein, an opposed surface of at least one of the substrates is formed with at least one groove between the liquid crystal area and the bonding region, and wherein in the expanding step at least an excessive part of the liquid crystal is accommodated in the groove, and the pressing means comprises a pressure roller which exerts pressure on the at least one substrate as the substrates are relatively moved and an auxiliary roller which maintains resulting pressurized state of the substrates.

10. The manufacturing method according to claim 9, wherein in the opposing step the grooves are connected to each other so as to surround the liquid crystal area in loop form when the grooves are projected onto a plane parallel with the opposed substrates.

11. The manufacturing method according to claim 9, wherein the opposed surface of the at least one substrate is formed with an air ejecting groove that communicates with the at least one groove and extends to an edge of the at least one substrate, and wherein in the expanding step air that is forced to escape from the liquid crystal is ejected through the air ejecting groove.

12. The manufacturing method according to claim 9, wherein the at least one groove has a width of 200 μm or more and a depth of 20 μm or more.

13. A liquid crystal device comprising:

a pair of substrates that are opposed to each other with a predetermined gap and fixed to each other at a bonding region that is provided along an outer periphery of the substrates;

a liquid crystal sealed between the substrates in a liquid crystal area that is inside the bonding region; and grooves formed on at least one opposed surface of at least one of the substrates between the liquid crystal area and the bonding region, the grooves being connected to each other so as to surround the liquid crystal area when the grooves on the substrates are projected onto a plane parallel with the opposed surfaces of the substrates.

14. The liquid crystal device according to claim 13, wherein the liquid crystal area is a display area.

15. The liquid crystal device according to claim 13, wherein both of the opposed surfaces of the substrates are formed with the grooves configured and arranged to overlie each other to surround the liquid crystal area in loop form when the substrates are bonded together and one of the opposed surface includes an air ejecting groove that communicates with at least one groove and extends to the edge of the surface.

16. The liquid crystal device according to claim 13, wherein the at least one groove has a width of 200 μm or more and a depth of 20 μm or more.

17. The liquid crystal device according to claim 13, wherein the liquid crystal is a ferroelectric liquid crystal.

18. A liquid crystal device comprising:

a pair of substrates that are opposed to each other with a predetermined gap and fixed to each other at a bonding region that is provided along an outer periphery of the substrates;

a liquid crystal sealed between the substrates in a liquid crystal area that is inside the bonding region; and grooves formed on at least one opposed surface of at least one of the substrates between the liquid crystal area and the bonding region, wherein, the liquid crystal is a ferroelectric liquid crystal, the liquid crystal is mixed with fine particles having an average primary particle diameter of 1 μm or less, and the grooves being connected to each other so as to surround the liquid crystal area when the grooves on the substrates are projected onto a plane parallel with the opposed surfaces of the substrates.

19. A manufacturing apparatus of a liquid crystal device in which a pair of substrates that are opposed to each other with a predetermined gap are fixed to each other at a bonding region that is provided along an outer periphery of the substrates and a liquid crystal is sealed between the substrates in a liquid crystal area that is inside the bonding region, comprising the steps of:

means for applying a curable adhesive to at least one of the substrates in the bonding region;

means for supplying a liquid crystal to one end portion, in the liquid crystal area, of at least one of the substrate by a predetermined amount;

means for opposing the substrates to each other with the curable adhesive and the liquid crystal interposed in between;

pressing means for expanding the liquid crystal from the one end portion to cover the entire liquid crystal area by exerting pressure on at least one of the opposed substrates from the one end portion to the other end portion in the liquid crystal area; and means for curing the curable adhesive, wherein, the liquid crystal area is a display area, and the pressing means comprises a pressure roller for exerting pressure on the at least one substrate as the substrates are relatively moved, and an auxiliary roller provided downstream of the pressure roller, for maintaining a pressurized state of the substrates that has been established by the pressure roller.

20. The manufacturing apparatus according to claim 19, wherein the liquid crystal area is a display area, and wherein the pressing means comprises a pressure roller that is rotated and moved on the at least one of substrate from the one end portion to the other end portion, whereby the liquid crystal is expanded from the one end portion to occupy the entire liquid crystal area.

21. The manufacturing apparatus according to claim 19, wherein the pressing means exerts the pressure from a position that is outside the one end portion and close to an edge of the at least one substrate.

22. The manufacturing apparatus according to claim 19, wherein the auxiliary roller has a smaller diameter than the pressure roller.

23. The manufacturing apparatus according to claim 19, further comprising means for heating, when the liquid crystal is expanded, the substrates to a temperature that is between a transition temperature between a smectic A phase and a cholesteric phase of the liquid crystal and a temperature 4° C. higher than the transition temperature and that is not higher than a transition temperature between the cholesteric phase and an isotropic phase of the liquid crystal.

24. The manufacturing apparatus according to claim 19, wherein after the liquid crystal is expanded, the curing means cures the curable adhesive while or after pressure is exerted uniformly on both outer surfaces of the opposed substrates.

* * * * *